US006203730B1

(12) United States Patent
Honda et al.

(10) Patent No.: US 6,203,730 B1
(45) Date of Patent: Mar. 20, 2001

(54) METHOD FOR GRANULATION AND GRANULATOR

(75) Inventors: Tetsuzo Honda, Urayasu; Kimikazu Kido, Ichikawa; Yuzuru Yanagisawa, Mobara; Hidetsugu Fujii, Sakura, all of (JP)

(73) Assignee: Toyo Engineering Corporation, Tokyo (JP)

( * ) Notice: Subject to any disclaimer, the term of this patent is extended or adjusted under 35 U.S.C. 154(b) by 0 days.

(21) Appl. No.: 09/141,992

(22) Filed: Aug. 28, 1998

(30) Foreign Application Priority Data

Sep. 4, 1997 (JP) .................................................. 9-240079

(51) Int. Cl.[7] ....................................................... B29B 9/10
(52) U.S. Cl. ............................... 264/7; 264/14; 264/117; 427/213; 425/7; 118/303
(58) Field of Search ................................. 264/7, 14, 117; 427/213; 425/7; 118/303

(56) References Cited

U.S. PATENT DOCUMENTS

| 3,241,520 | 3/1966 | Wurster et al. . | |
|---|---|---|---|
| 4,217,127 | 8/1980 | Kono et al. | 427/213 |
| 4,219,589 | 8/1980 | Niks et al. | 427/213 |
| 4,343,622 | 8/1982 | Bruynseels | 23/313 |
| 4,749,595 | 6/1988 | Honda et al. | 427/213 |
| 4,857,098 | 8/1989 | Shirley, Jr. . | |
| 5,120,345 | 6/1992 | Kayaert et al. . | |

FOREIGN PATENT DOCUMENTS

| 0 570 218 A1 | 11/1993 | (EP) . |
| 2 268 094 | 1/1994 | (GB) . |
| WO 94/03267 | 2/1994 | (WO) . |
| WO 94/03267 | 12/1994 | (WO) . |
| WO 95/24263 | 9/1995 | (WO) . |

*Primary Examiner*—Mary Lynn Theisen
(74) *Attorney, Agent, or Firm*—Flynn, Thiel, Boutell & Tanis, P.C.

(57) ABSTRACT

There is disclosed an improved, energy-saving granulation method, wherein use is made of a granulator (1) having a bottom floor (9) of a granulation section whose bottom is a perforated plate, an upper air feed pipe (23) for feeding air for fluidization to the bottom floor of the granulation section, a lower air feed pipe (2), air feed pipes (3, 4, 5) branched from the lower air feed pipe for jetting air into the granulation section, and jetting nozzles (6, 7, 8) provided at the centers of the air outlets for jetting a molten raw material; which involves the steps of jetting a molten raw material from the jetting nozzles to approximately spherical nuclei in the granulation section, which have been fed after the particle diameter has been caused to be an average particle diameter of 0.4 to 3.0 mm, to form granules. There is also disclosed an improved granulator.

19 Claims, 9 Drawing Sheets

B type granulator

D type granulator

Fig.15  F type granulator
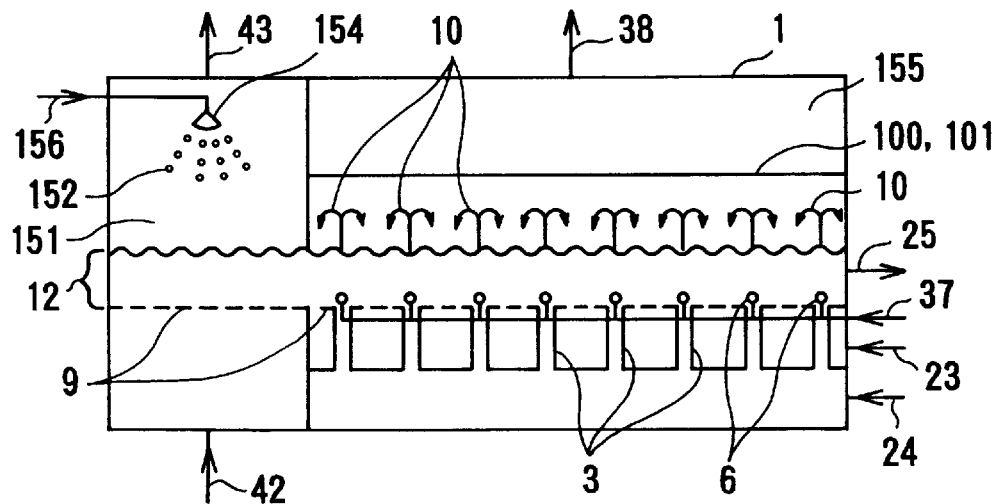
Fig.16
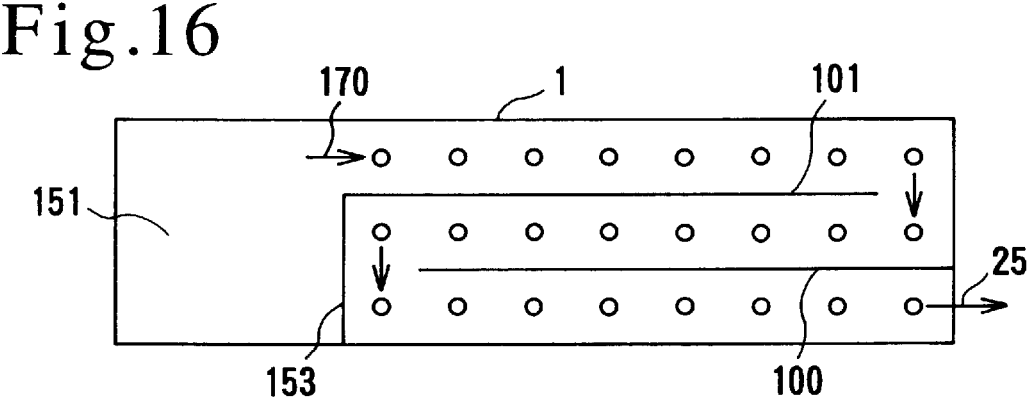
Fig.17  S type granulator
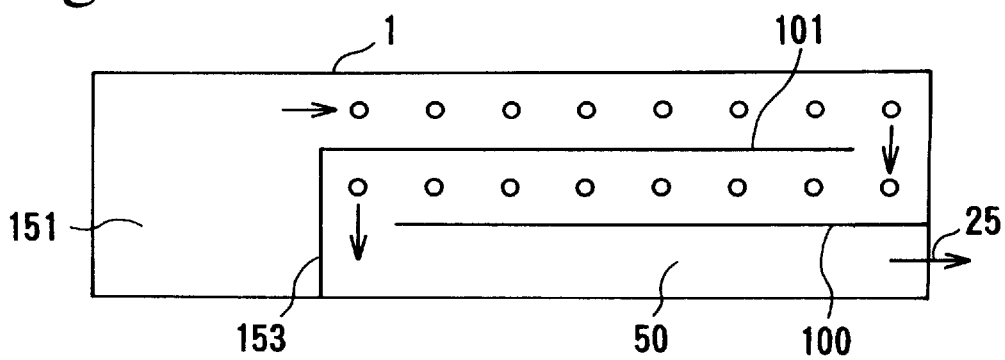

METHOD FOR GRANULATION AND GRANULATOR

FIELD OF THE INVENTION

The present invention relates to an improved energy-saving granulation method for forming granules from a molten raw material, such as urea or sulfur, and from a slurry, for example, of urea/ammonium sulfate comprising ammonium sulfate in the solid state contained in molten urea. Further, the present invention relates to a granulator used in the above method.

BACKGROUND OF THE INVENTION

With respect to methods and granulators for granulating urea, urea/ammonium sulfate, etc., many proposals have been made. For example, the inventors of the present invention have proposed, as granulation methods and granulators in which a combination of a fluidized bed and a spraying (injection) bed is used, for urea, a method for working (processing) particles, as disclosed in JP-B-4-63729 ("JP-B" means examined Japanese patent publication), a granulation method and a granulator that are improvements of the method disclosed in the patent publication above, and further developed a method for producing urea/ammonium sulfate fertilizer granules. On the other hand, an improved method for granulating urea, in which a fluidized bed is used, is disclosed in JP-B-56-47181, and a method for producing granules each made up of a core and a coating layer is disclosed in JP-B-60-13735.

Out of such conventional or preceding granulation methods, a representative method will be described below with reference to FIG. 18.

In FIG. 18, at the start-up, seed particles of urea are fed as nuclei to a granulator 1 (the A-type granulator described later), through a line 41 from a line 40, which is a feed port of the line. In the granulator 1, an aqueous urea solution containing 90% by weight or more, preferably 95% by weight or more, of urea is sprayed as liquid droplets, having a diameter of 150 to 600 $\mu$m, to the nuclei at a prescribed spray angle chosen from 30 to 80 degrees, from nozzles 6, 7, and 8. Further, molten urea 17, having a concentration of 90% by weight or more, preferably 95% by weight or more, fed from a urea synthesis plant or the like (not shown), wherein the temperature of the molten urea is adjusted to 125 to 145° C., is fed from a line 31 to a mixing tank 21, and then it is fed through a line 36, a pump 22, and a line 37, to the nozzles 6, 7, and 8.

Upon spraying the above seed particles of urea fed from the line 41 with the aqueous urea solution in the granulator 1, the seed particles grow and are stirred up to a space 60 by jetting currents from air feed pipes 3, 4, and 5, branched from a lower air feed pipe 2, led from a line 24, which is a lower feed port, and the particles are permitted to drop as a grown granular urea 70, in a lower space 11 from a state 10 in which urea particles are stirred up. On the other hand, fluidization air is fed from a line 23, which is an upper feed port, so that the grown granular urea 70 on a bottom floor 9, having multiple opening holes perpendicular to the bottom, are kept in a fluidized state in the space 11 to the extent of a level 12, and the granular urea that is growing is fluidized, to fill all the space 11 over the nozzles 6, 7, and 8.

The above movements are repeated, and the granular urea thus formed is finally discharged from a line 25, which is a discharge port.

The proportion of those of a nominal product size among the granular urea discharged from the line 25 of the granulator 1 (hereinbelow, this proportion is referred to as a content of the nominal product size at the granulator outlet.), is generally 75 to 80%, as shown in Comparative Example 1 described below, and the granular urea is sifted through a sieve 13, to be separated into a standard (on-specification) product and a nonstandard (off-specification) product, with respect to the desired content of the nominal product size in a product. The standard product is passed through a line 26, to be stored as the product 14. On the other hand, to keep the number of nuclei in the granulator 1 constant, in view of stable continuation of production of the product, the product having a particle diameter greater than the specified particle diameter, and part of the standard product, are passed through a line 27 into a crusher 15, wherein they are crushed; the product having a particle diameter smaller than the specified particle diameter is passed through a line 28 and is added to line 29; and the mixture is passed through a line 30 and the line 41 to the inlet of the granulator 1, to be recycled as nuclei for the granulation.

Further to this discussion, it is well known that, in this recycling, when urea granules are crushed by using the crusher 15 to form smaller particles, a crushed product having a broad distribution of particle diameter is formed containing a large amount of powder, and the energy consumption for the crushing is large. As a result, when such a crushed product is recycled as nuclei to the inlet of the granulator 1, the occurrence of a large amount of dust in a fluidized state cannot be avoided.

Further, the recycling of a crushed product is not preferable in view of the quality of the product. The product recycled as nuclei to the line 41 of the inlet of the granulator 1 is crushed product, and therefore it is not spherical. Such crushed pieces are coated in the granulator 1, to take rounded shapes, and they are discharged from the granulator 1 with their shapes remaining odd-shaped that can be evaluated by the method described in detail later. As a result, with respect to the size, the resulting product comes up to a standard product, but with respect to the shape, the resulting product contains odd-shaped granules and is quite lowered in product value.

As described above, when the product crushed in the crusher 15 is recycled as nuclei to the inlet of the granulator, a large amount of dust is generated in the granulator, the yield of the product is poor, and the product contains odd-shaped granules.

In the method for producing urea granules, as described in JP-B-56-47181, the granulator shown in FIG. 2 therein is of a fluidized bed type, and it can be seen that product crushed in a crusher in the production process is recycled as nuclei to the granulator. Accordingly, even this method cannot solve the problems that dust is generated, the yield of the product is poor, and odd-shaped granules are included.

SUMMARY OF THE INVENTION

An object of the present invention is to provide a granulation method wherein crushing energy is omitted, a step of recycling crushed nuclei is omitted, less dust is generated, the product yield is good, and less odd-shaped product can be obtained.

Another object of the present invention is to provide a granulator wherein the above method is used.

Other and further objects, features, and advantages of the invention will appear more fully from the following description, taken in connection with the accompanying drawings.

BRIEF DESCRIPTION OF THE DRAWINGS

FIG. 15 is a schematic front view of the granulator (of the F type described later) of the present invention in which a nuclei producer and the B-type granulator are integrated.

FIG. 16 is a schematic plane view of the F-type granulator of the present invention.

FIG. 17 is a schematic plane view of the granulator (of the S type described later) of the present invention in which a cooling function and the F-type granulator are integrated.

DETAILED DESCRIPTION OF THE INVENTION

Figure 1:
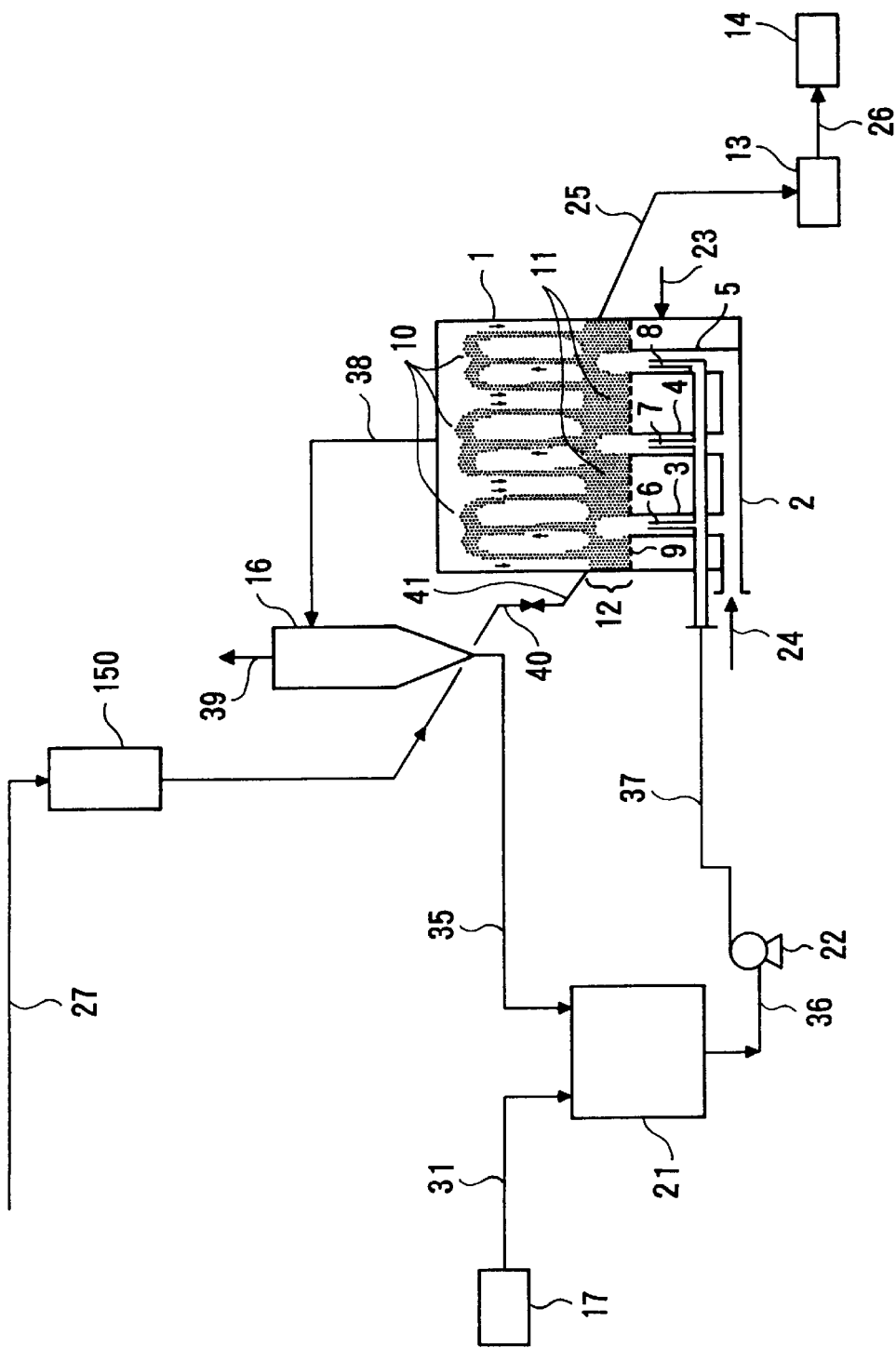
FIG. 1 is an illustrative view showing one embodiment relating to urea and sulfur of the present invention.

The objects of the present invention have been attained by the following granulation methods and granulators.

Specifically, the present invention provides:

(1) An improved granulation method, wherein use is made of a granulator having a bottom floor of a granulation section whose bottom is a perforated plate, an upper air feed pipe for feeding air for fluidization to the bottom floor of the said granulation section, a lower air feed pipe, air feed pipes branched from the lower air feed pipe for introducing air into the granulation section, and spraying nozzles provided at the centers of the said air outlets for spraying a molten raw material, which comprises spraying a molten raw material from the jetting nozzles to approximately spherical nuclei in the granulation section, which have been fed after the particle diameter has been caused to be an average particle diameter of 0.4 to 3.0 mm, to form granules.

(2) An improved granulation method, wherein use is made of a granulator having a bottom floor of a granulation section whose bottom is a perforated plate, an air feed pipe for feeding air for fluidization to the bottom floor of the granulation section, and spraying nozzles provided in the bottom floor for spraying a molten raw material by using highly pressurized air as an auxiliary gas, which comprises spraying a molten raw material from the spraying nozzles to approximately spherical nuclei in the granulation section, which have been fed after the particle diameter has been caused to be an average particle diameter of 0.4 to 3.0 mm, to form granules.

(3) An improved granulation method, wherein use is made of a granulator having a bottom floor of a granulation section whose bottom is a perforated plate, an upper air feed pipe for feeding air for fluidization to the bottom floor of the granulation section, a lower air feed pipe, air feed pipes branched from the lower air feed pipe for introducing air into the said granulation section, spraying nozzles provided at the centers of the air outlets for spraying a molten raw material, and one or more partition walls provided on the floor bottom, for partitioning the air feed pipes, so that the partition walls may form a passage in which nuclei may be moved continuously from the inlet of the granulator toward the outlet of the granulator; which comprises spraying a molten raw material from the spraying nozzles to the nuclei that are approximately spherical nuclei in the granulation section, which have been fed after the particle diameter has been caused to be an average particle diameter of 0.4 to 3.0 mm, to form granules.

(4) An improved granulation method, wherein use is made of a granulator having a bottom floor of a granulation section whose bottom is a perforated plate, an air feed pipe for feeding air for fluidization to the bottom floor of the granulation section, spraying nozzles provided in the bottom floor for spraying a molten raw material by using highly pressurized air as an auxiliary gas, and one or more partition walls provided on the bottom floor, for partitioning the nozzles, so that the partition walls may form a passage in which nuclei may be moved continuously from the inlet of the granulator toward the outlet of the granulator; which comprises spraying a molten raw material from the spraying nozzles to the nuclei that are approximately spherical nuclei in the granulation section, which have been fed after the particle diameter has been caused to be an average particle diameter of 0.4 to 3.0 mm, to form granules.

(5) The improved granulation method as stated in the above (1), (2), (3), or (4), wherein the molten raw material is sprayed through a shower-type nozzle with a curved spherical plate with a number of holes provided therein, the sprayed molten urea is cooled and solidified, and the cooled solidified approximately spherical nuclei, having an average particle diameter of 0.4 to 2.0 mm, are fed.

(6) The improved granulation method as stated in the above (1), (2), (3), or (4), wherein the molten raw material is sprayed through an oscillating shower-type spray nozzle, the sprayed molten urea is cooled and solidified, and the cooled solidified approximately spherical nuclei, having an average particle diameter of 0.4 to 2.0 mm, are fed.

(7) The improved granulation method as stated in the above (1), (2), (3), or (4), further comprising recycling to the granulator granules having smaller particle diameters out of the granules of the product, to make the particle diameter distribution of the product acute (narrow).

(8) The improved granulation method as stated in any one of the above (1) to (7), wherein the molten raw material liquid is any one of molten urea, molten urea in the form of a slurry containing another solid component in molten urea, and molten sulfur.

(9) The improved granulation method as stated in any one of the above (1) to (7), wherein, as the molten raw material, molten urea is fed to the former section nozzles of the granulator, and molten sulfur is fed to the latter section nozzles of the granulator.

(10) An improved granulator, which is a granulator in the above (1) having a bottom floor of a granulation section whose bottom is a perforated plate, an upper air feed pipe for feeding air for fluidization to the bottom floor of the said granulation section, a lower air feed pipe, air feed pipes branched from the lower air feed pipe for introducing air into said granulation section, and spraying nozzles provided at the centers of the air outlets for spraying a molten raw material liquid, to form granules by spraying a molten raw material from the spraying nozzles to nuclei fed in the granulation section, which nuclei have been caused to have a prescribed particle diameter, wherein the direction of the flow of air passing through the holes made in the perforated plate has a slanted angle with the direction of the flow of granules with respect to the vertical axis.

(11) An improved granulator, which is a granulator in the above (3) having a bottom floor of a granulation section whose bottom is a perforated plate, an upper air feed pipe for feeding air for fluidization to the bottom floor of the granulation section, a lower air feed pipe, air feed pipes branched from the lower air feed pipe for introducing air into the said granulation section, spraying nozzles provided at the centers of the air outlets for spraying a molten raw material, and partition walls provided on the bottom floor, for partitioning the air feed pipes, so that the partition walls may form a passage in which nuclei may be moved continuously from the inlet of the granulator toward the outlet of the granulator, to form granules by spraying a molten raw material from the spraying nozzles to the nuclei fed in the granulation section, which nuclei have been caused to have a prescribed particle diameter, wherein the direction of the flow of air passing through the holes made in the perforated plate has a slanted angle with the direction of the flow of granules with respect to the vertical axis.

(12) An improved granulator, which is a granulator in the above (2) having a bottom floor of a granulation section whose bottom is a perforated plate, an air feed pipe for feeding air for fluidization to the bottom floor of the granulation section, and spraying nozzles provided in the bottom floor for spraying a molten raw material liquid by using highly pressurized air as an auxiliary gas, to form granules by spraying a molten raw material from the spraying nozzles to nuclei fed in the granulation section, which nuclei have been caused to have a prescribed particle diameter, wherein the direction of the flow of air passing through the holes made in the perforated plate has a slanted angle with the direction of the flow of granules with respect to the vertical axis.

(13) An improved granulator, which is a granulator in the above (4) having a bottom floor of a granulation section whose bottom is a perforated plate, an air feed pipe for feeding air for fluidization to the bottom floor of the granulation section, spraying nozzles provided in the bottom floor for spraying a molten raw material by using highly pressurized air as an auxiliary gas, and partition walls provided on the bottom floor, for partitioning the nozzles, so that the partition walls may form a passage in which nuclei may be moved continuously from the inlet of the granulator toward the outlet of the granulator, to form granules by spraying a molten raw material from the spraying nozzles to the nuclei fed in the granulation section, which nuclei have been caused to have a prescribed particle diameter, wherein the direction of the flow of air passing through the holes made in the perforated plate has a slanted angle with the direction of the flow of granules with respect to the vertical axis.

(14) A granulator, which is a granulator to be used in the above (3) or (4), wherein one or more partition walls are provided on the bottom floor, with the partition walls parallel to the walls of the granulator, so that the partition walls may form a passage in which nuclei may be moved continuously from the inlet of the granulator toward the outlet of the granulator, and that the partition walls are staggered, so that at least one of the partition walls extends from one side section of the granulator toward the other opposite side section of the granulator, and the other partition wall extends from the other opposite side section of the granulator toward the one side section of the granulator.

(15) The improved granulator as stated in any one of the above (10) to (14), wherein the granulator has such a specified elongate configuration that the ratio L/M is 2 or more but 40 or less, in which L is the length of the bottom section of the granulator in the direction of the flow of granules, and M is the width of the flow of granules.

(16) The improved granulator as stated in any one of the above (10) to (15), wherein the granulator has integrally a function for feeding, as nuclei, approximately spherical nuclei having an average particle diameter of 0.4 to 1.0 mm, to the granulator.

(17) The improved granulator as stated in any one of the above claims (10) to (16), wherein the function integrated with the granulator for feeding approximately spherical nuclei having an average particle diameter of 0.4 to 1.0 mm to the granulator, is a shower-type spray nozzle.

(18) The improved granulator as stated in any one of the above (10) to (16), wherein the function integrated with the granulator for feeding approximately spherical nuclei having an average particle diameter of 0.4 to 1.0 mm to the granulator, is an oscillated shower-type spray nozzle.

(19) The improved granulator as stated in any one of the above (10) to (18), wherein the function integrated with the granulator for feeding approximately spherical nuclei having an average particle diameter of 0.4 to 1.0 mm to the granulator, is integrated with a cooling function for cooling a product.

In the present invention, a granulator is used wherein while seed particles are charged and fluidized, a molten raw material is jetted to the seed particles, so that granules are grown to carry out granulation using the seed particles as nuclei.

The term "nuclei" in the granulation section of the granulator means urea, sulfur, or the like, which is previously produced and is fed to the granulator. In the present invention, a mixed fertilizer of urea/ammonium sulfate can be granulated, and that generally refers to one containing ammonium sulfate in an amount of 60% by weight (hereinbelow sometimes referred to as wt %) or less. In the case of the production of urea, the molten raw material to be fed to the nozzles of the granulator for spraying the molten raw material, is an aqueous solution containing urea in an amount of preferably 90% by weight or more, and more preferably 95% by weight or more. In the case of the production of a mixed fertilizer of urea/ammonium sulfate, as the molten raw material to be fed to the nozzles of the granulator for spraying the molten raw material, preferably a mixture is used that is prepared by mixing, uniformly, a urea solution having a concentration of preferably 96% by weight or more with ammonium sulfate in the solid state, having a particle diameter distribution of 150 to 600 μm. In the case of sulfur, generally, molten sulfur containing sulfur in an amount of 90% by weight or more is used. In the case of the production of urea and urea/ammonium sulfate, as the molten urea to be fed to the nuclei generator (nucleus generating apparatus), one containing urea preferably in an amount of 99.5% by weight or more is used. In the case of the production of sulfur and urea coated with sulfur, molten sulfur containing sulfur in an amount of generally 90% by weight or more is used. However, the present invention is not limited to the preceding.

In the present invention, the product is described below. The term "product" means a product whose content (proportion) of nominal product size granules in the product is within a desired range. As shown in FIG. 1 described below, the final product, when not recycled, is the product obtained from the outlet of the granulator without using a sieve. If it is recycled (without using a crusher), the final product is the product obtained after sifting through a sieve. By the term "nominal product size" is meant a grade shown by range wherein the particle diameter of the product is specified.

The nominal product size obtained by the present invention includes, but is not limiting to the present invention, 1 to 3 mm, 2 to 4 mm, 3 to 5 mm, 5 to 8 mm, 8 to 12 mm, 10 to 15 mm, and so forth, which are nominal. The proportion of the product with a nominal product size in a product varies depending on the nominal size and the commercial use, and it may be required to be 70% or more, 80% or more, and 90% or more, as the case may be. It is not easy to increase the proportion of nominal product size granules. Thus, what percent of the nominal production size can be achieved is important.

To obtain one of the above products, the average particle diameter of nuclei in the present invention is selected from the range of 0.4 to 3.0 mm. The nuclei having an average particle diameter of 0.4 to 3.0 mm, for example, nuclei having an average particle diameter of 0.4 to 1.0 mm or 0.4 to 2.0 mm, can be obtained by the air prilling method (hereinafter referred to as the prilling method). Nuclei having an average particle diameter of 0.4 to 1.0 mm are preferably applied when the granulator and the nuclei producer are integrated, while both nuclei having an average particle diameter of 0.4 to 1.0 mm and nuclei having an average particle diameter of 0.4 to 2.0 mm, are suitably applied when the nuclei producer is positioned outside of the granulator. The reasons for the above are as follows.

As is well known, according to the prilling method, while liquid droplets of molten urea are dropped from an upper part of a granulation tower several tens of meters high, cold air is sent from a lower part of the granulation tower, and the liquid droplets are solidified during their fall. The height of the granulation tower is determined by the average particle diameter of the solidified particles, and the larger the average particle diameter is, the higher the granulation tower becomes.

In the prilling method, nuclei having an average particle diameter of up to about 3.0 mm can be produced. However, when the average particle diameter exceeds 2 mm, the height of the nuclei producer to air-cool (this corresponds to the height of the granulation tower) becomes too much to be used practically. When the average particle diameter is 2.0 mm or less, the height of the nuclei producer may be practical, and particularly when the granulator and the nuclei producer are integrated, 0.4 to 1.0 mm is selected, since the granulator has a usual height. When the nuclei producer is positioned outside of the granulator, 0.4 to 1.0 mm or 0.4 to 2.0 mm is arbitrarily selected, for the above reason. Nuclei whose average diameter exceeds 2.0 mm can, alternatively, be obtained by growing the above nuclei having an average particle diameter of 0.4 to 1.0 mm by the granulation method disclosed in JP-B-4-63729. In short, it is enough to select the nuclei having these average particle diameters, depending on the production the nuclei, the form of a granulator described below, or the desired nominal product size.

Conventionally, in the prilling method, approximately spherical urea granules having an average particle diameter of about 1.5 to 2.0 mm are obtained as a product, wherein the distribution of the particle diameters is from 0.8 to 2.8 mm. It is known that granules produced by the prilling method have a strength of about 40% of that of granules obtained by the granulation method disclosed in JP-B-4-63729, assuming they have the same particle diameter. Use of them as nuclei for the granulation was studied. However, as shown in Reference Example 1, when a product of granules having a nominal size of 2 to 4 mm was produced by using nuclei having an average particle diameter of 1.6 mm, the center of the granules lacked enough physical strength compared with the case of Example 1.

In the case of a granulator having a spraying bed and a fluidized bed in combination and a granulator of the fluidized bed type, if the average particle diameter of the nuclei particles obtained in any method is less than 0.4 mm, the nuclei particles charged into the granulator 1 are entrained by the rising air for fluidization, as described later, and they may become dust. In the case wherein particles obtained by the prilling method were used as nuclei, if the average particle diameter exceeds 1.0 mm, the product of a nominal size of 2 to 4 mm or less lacks enough physical strength, failing to attain the object of the present invention. If a product of granules of a nominal size of 5 to 8 mm or more is produced, however, the particle diameter of nuclei obtained by the prilling method may exceed 1.0 mm, and it is preferably 3.0 mm or less, since the physical strength of the product is not changed, as shown later in Example 2. As an example of standard, the point is that, if the weight of one nuclei particle (before coating) is about 0.5 to 10.0% of the weight of one granule of the product (after coating), the physical strength of the product can be high enough, even if nuclei obtained by the prilling method are used, regardless of the nominal product size. The proportion of the nuclei particles in the product particles is preferably 0.5 to 5.0% by weight, and more preferably 0.5 to 2.0% by weight. Parenthetically, in the case of a granulator of a fluidized bed type, a preferable range of the average particle diameter is the same as above.

In more detail, if nuclei having an average particle diameter of 0.4 to 3.0 mm, to be used in the present invention, are obtained only by the prilling method, the average particle diameter of the nuclei selected is 0.4 to 1.0 mm for the production of products having a nominal size of 1 to 3 mm, a nominal size of 2 to 4 mm, and a nominal size of 3 to 5 mm. More preferably, for a product having a nominal size of 1 to 3 mm, nuclei having an average particle diameter of 0.4 to 0.5 mm are selected, and for products having a nominal size of 2 to 4 mm and a nominal size of 3 to 5 mm, nuclei having an average particle diameter of 0.5 to 0.8 mm are selected.

For products having a nominal size of 5 to 8 mm, a nominal size of 8 to 12 mm, and a nominal size of 10 to 15 mm, the average particle diameter of the nuclei is selected to be 0.4 to 3.0 mm. More preferably, for a product having a nominal size of 5 to 8 mm, the average particle diameter of the nuclei is selected to be 1.3 to 1.6 mm, for a product having a nominal size of 8 to 12 mm, the average particle diameter of the nuclei is selected to be 1.5 to 2.1 mm, and for a product having a nominal size of 10 to 15 mm, the average particle diameter of the nuclei is selected to be 2.5 to 3.0 mm. It is needless to say that the present invention is not limited to the above.

Herein, the term "average particle diameter" used in the present invention means a weight-average particle diameter which is the particle diameter of the particle (or granule) for 50% of particles (or granules) in number, which is a so-called median diameter.

In the present invention, the nuclei particles (seed particles) to be charged into the granulator are approximately spherical. Herein, the term "approximately spherical" means spherical in shape as obtained by the prilling method or more spherical. The spherical degree is preferably such that the sphere coefficient by the method of testing the presence or absence of odd-shaped products in the Examples is 90% or more.

With respect to the interrelation among the particle diameter distribution of the nuclei, the residence time distribution of the nuclei in the granulator, and the particle diameter distribution of the product obtained from the nuclei, the operating conditions of the conventionally used granulators (the below-described A-type granulator and B-type granulator) are approximately constant in certain ranges. Accordingly, the residence time distribution of the nuclei in the granulator is almost constant in a certain range.

For example, when a product of granules having a nominal size of 2 to 4 mm is to be obtained, approximately spherical nuclei having an average particle diameter of 0.4 to 1.0 mm, and preferably nuclei whose particle diameters are nearly uniform, i.e., nuclei having a particle distribution of 0.4 to 1.0 mm, and more preferably 0.5 to 0.8 mm, are fed to a granulator having a spraying bed and a fluidized bed in combination. In this case, for example, as shown in Example 1 and Example 6 compared to Comparative Example 1, a product having a desirable content of the nominal product size at the granulator outlet of about 85 to 88% can be obtained, which is more effective than the conventionally obtained product having a content of the nominal product size at the granulator outlet of 75 to 80%, and the product is free from odd-shaped granules. Additionally stated, it can be understood that, to make the desired content of the nominal product size at the granulator outlet increased, as shown in Example 5, the granules at the granulator outlet can be sifted through a sieve, to obtain the product, and the separated under granules under the sieve are recycled to the granulator.

Hereinbelow, the granulator used in the present invention is described. In passing, in the description based on the drawings, the same reference numerals in FIGS. 1 to 18 refer to the same things, and their descriptions are sometimes omitted.

Figure 3:
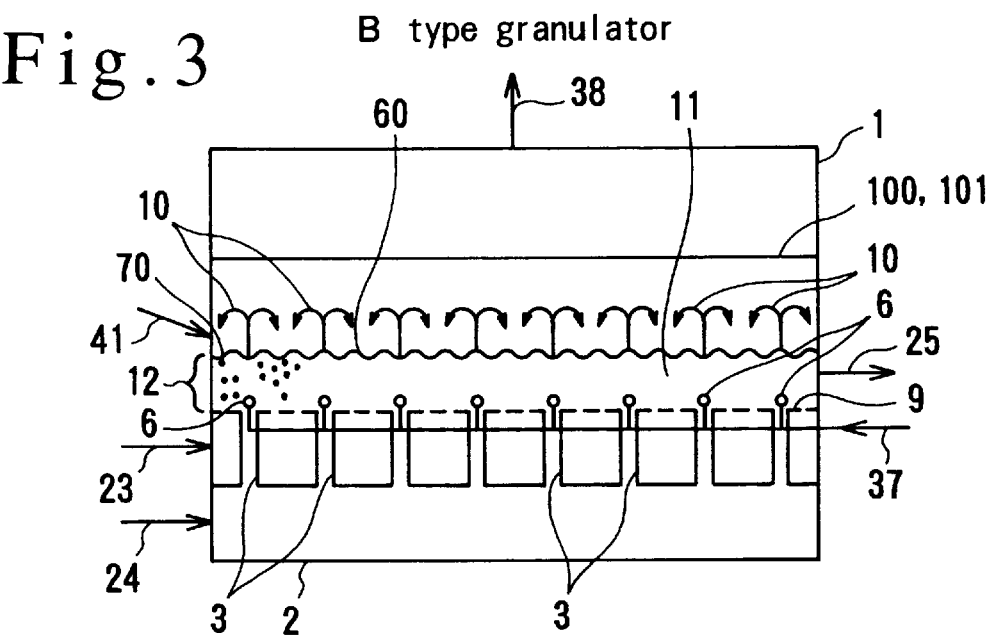
FIG. 3 is a schematic front view of the granulator (of the B type described later) of the present invention.
Figure 4:
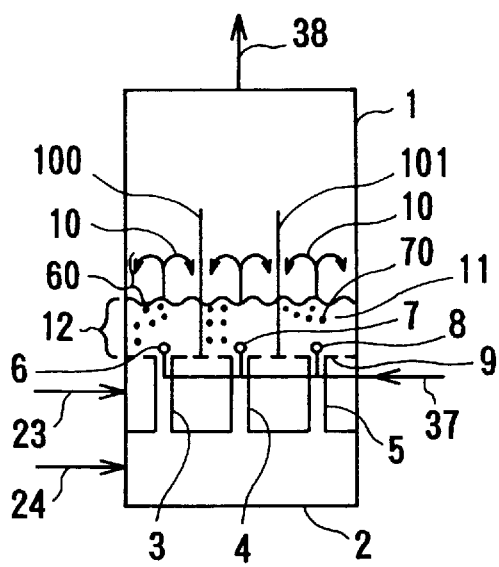
FIG. 4 is a schematic side view of the granulator (of the B type) of the present invention.
Figure 5:
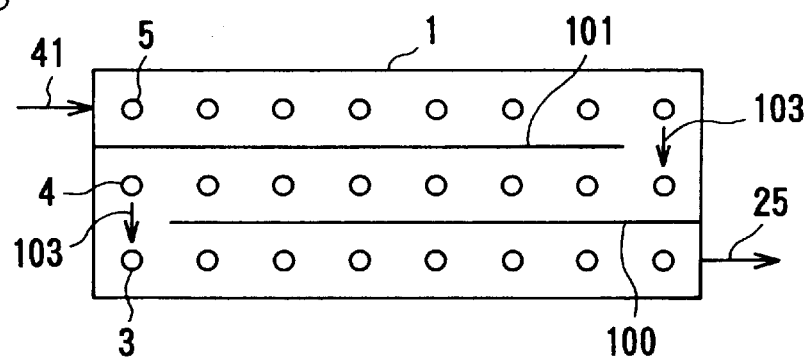
FIG. 5 is a schematic plane view of the granulator (of the B type) of the present invention.

FIGS. 3 to 5 are respectively a front view, a side view, and a plane view showing schematically one embodiment of the granulator of the present invention (hereinafter the granulator being referred to as the B-type granulator). The B-type granulator comprises a bottom floor 9 in a granulation section whose bottom is a perforated plate, an upper air feed pipe for feeding air for fluidization fed from a line 23 to the bottom floor 9 of the granulation section, a lower air feed pipe fed from a line 24, air feed pipes 3, 4, and 5, branched from the said lower air feed pipe for introducing air into the granulation section, nozzles 6, 7, and 8, provided in the center sections of the said air outlets for spraying a molten raw material liquid, and partition walls 100 and 101, provided on the bottom floor 9, for partitioning the rows of the said air feed pipes from each other, so that the partition walls may form a passage in which nuclei fed from a line 41 may be moved continuously from the inlet of the granulator toward the outlet of the granulator, with the nuclei being fluidized vertically.

Figure 6:
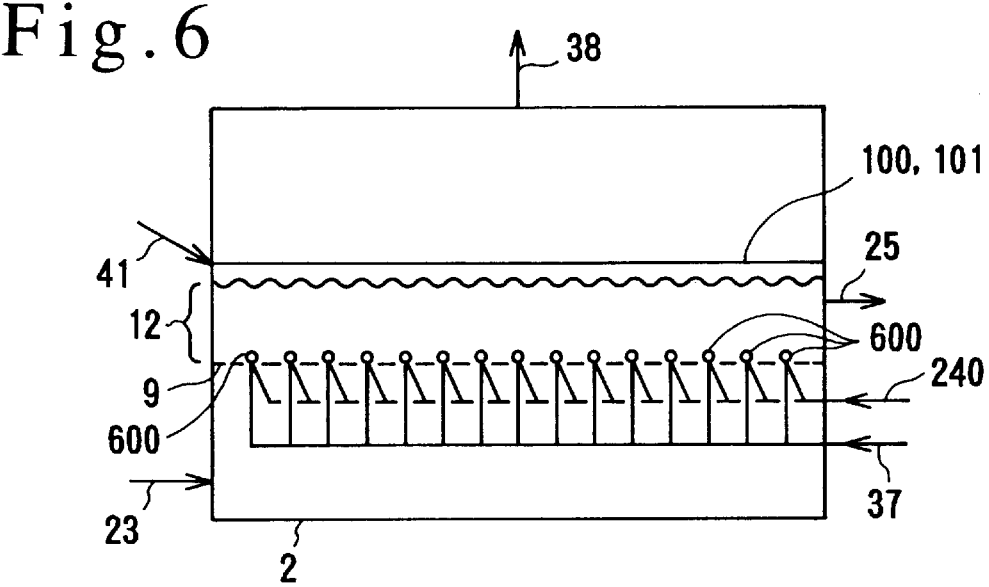
FIG. 6 is a schematic front view of the granulator (of the D type described later) of the present invention.
Figure 7:
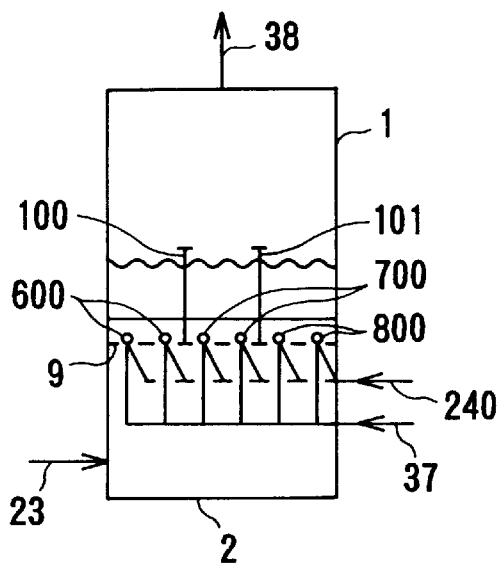
FIG. 7 is a schematic side view of the granulator (of the D type) of the present invention.
Figure 8:
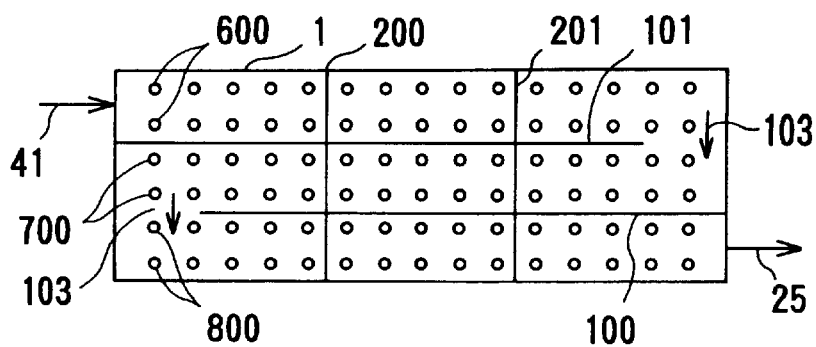
FIG. 8 is a schematic plane view of the granulator (of the D type) of the present invention.

FIGS. 6 to 8 are respectively a front view, a side view, and a plane view showing schematically another embodiment of the granulator of the present invention (hereinafter the granulator being referred to as the D-type granulator). The D-type granulator comprises a bottom floor 9 in a granulation section whose bottom is a perforated plate, an air feed pipe for feeding air for fluidization fed from a line 23 to the bottom floor 9 of the granulation section, nozzles 600, 700, and 800, provided in the bottom floor, for spraying a molten raw material liquid by using highly pressurized air fed from a line 240 as an auxiliary gas, and partition plates 100 and 101, provided on said bottom floor 9, for partitioning the paired rows of the nozzles for spraying a molten raw material liquid from each other, so that the partition plates may form a passage in which nuclei fed from a line 41 may be moved continuously from the inlet of the granulator toward the outlet of the granulator, with the nuclei being fluidized vertically.

In the B-type granulator and the D-type granulator, the partition plates 100 and 101 are placed in parallel with the walls of the granulator. The partition plates 100 and 101 are staggered (alternated) such a way that at least one of the partition walls extends from one side section of the granulator toward the other opposite side section of the granulator, and the other partition wall extends from the other opposite side section of the granulator toward the one side section of the granulator. The partition walls 100 and 101 leave at least one set of the air feed pipes unpartitioned, to form a communication section 103, and the row of the partitioned air feed pipes communicates with the adjacent row of the partitioned air feed pipes through the communication section 103.

In the B-type granulator, preferably the height of the partition walls 100 and 101 is a little higher than the level (height) to which particles to be nuclei are blown up in the granulation section. In the D-type granulator, it is satisfactory if the height of the partition walls 100 and 101 is positioned higher than the level of the fluidized layer.

Figure 9:
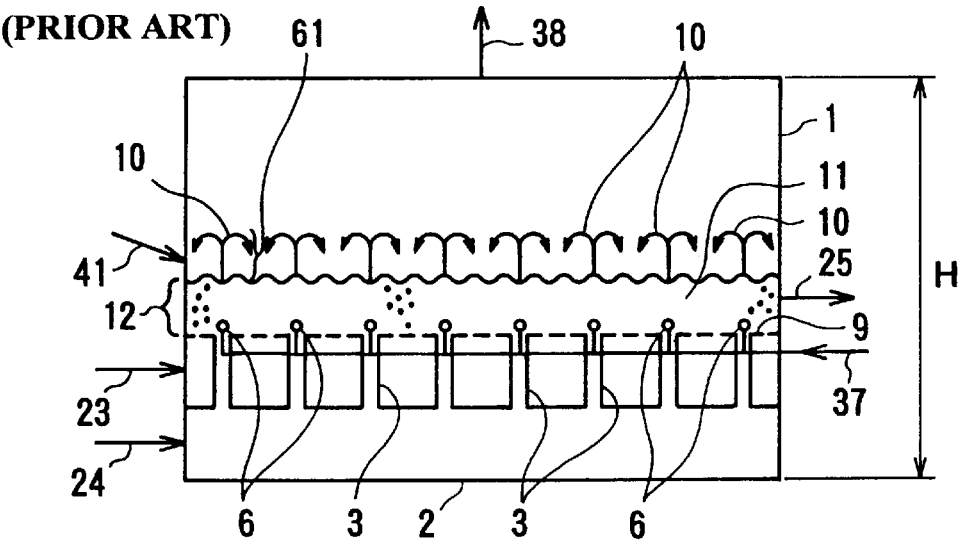
FIG. 9 is a schematic front view of a conventional granulator (of the A type) in which a spraying bed and a fluidized bed are combined.
Figure 10:
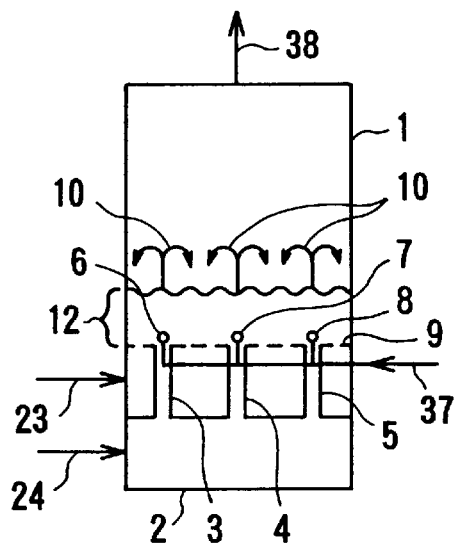
FIG. 10 is a schematic side view of the conventional granulator (of the A type) in which a spraying bed and a fluidized bed are combined.
Figure 11:
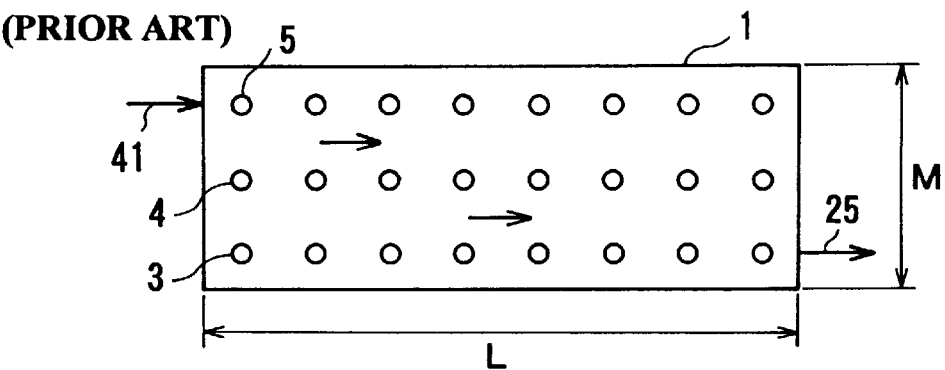
FIG. 11 is a schematic plane view of the conventional granulator (of the A type) in which a spraying bed and a fluidized bed are combined.

In the present invention, a known granulator can be used, such as a granulator described in JP-B-4-63729 or its modified version. FIGS. 9 to 11 show an embodiment showing schematically the conventional granulator having a fluidized bed and a spraying bed in combination, described in JP-B-4-63729 supra (hereinafter the granulator being referred to as the A-type granulator): FIG. 9 is a front view thereof, FIG. 10 is a side view thereof, and FIG. 11 is a plane view thereof. This granulator corresponds to a version formed by removing the partition walls 100 and 101 from the above B-type granulator.

Figure 12:
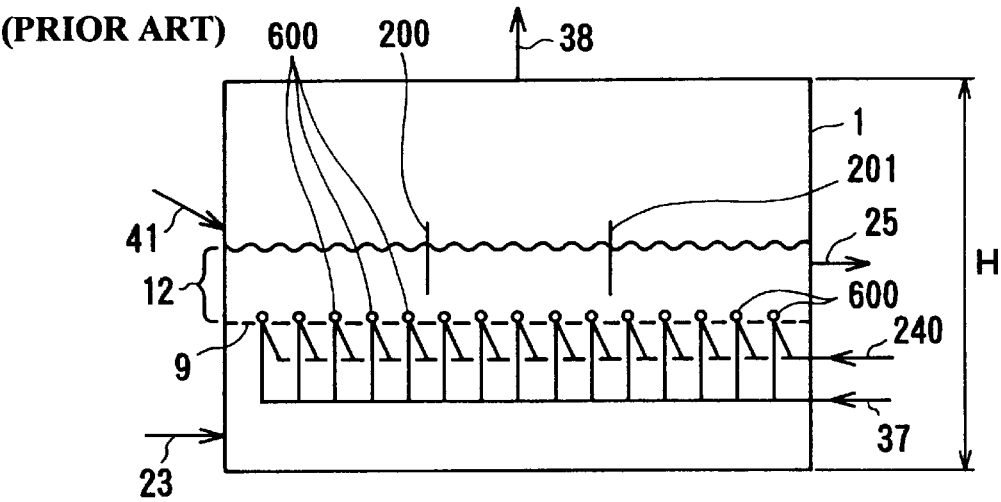
FIG. 12 is a schematic front view of a conventional granulator (of the C type described later) of a fluidized bed type.
Figure 13:
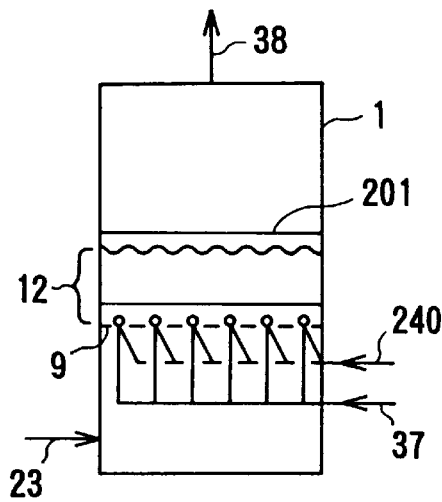
FIG. 13 is a schematic side view of the conventional granulator (of the C type) of a fluidized bed type.
Figure 14:
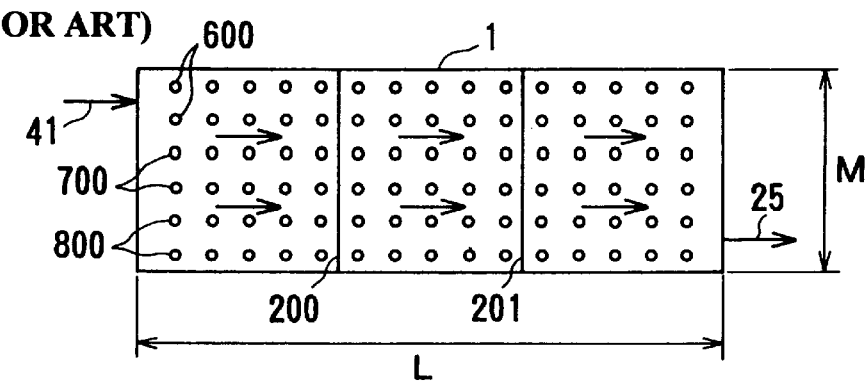
FIG. 14 is a schematic plane view of the conventional granulator (of the C type) of a fluidized bed type.

In the present invention, as the granulator, conventional granulators described in JP-B-56-47181 and JP-B-60-13735 that are schematically shown in FIGS. 12 to 14 (hereinafter referred to as the C-type granulator) may be used.

FIG. 12 is a front view, FIG. 13 is a side view, and FIG. 14 is a plane view. As is shown in the drawings, in the C-type granulator, baffle plates 200 and 201 are positioned in the upper part of a level 12, approximately perpendicularly to the direction of the flow of the recycled nuclei fed from a line 41, so that the flow of the recycled nuclei from the inlet of the granulator to the outlet thereof may be cut off. While the nuclei are exposed to the liquid droplets sprayed from nozzles 600, 700, and 800, they travel through the space between the baffle plates 200 and 201 and a bottom floor 9, and grow. Except for that, the C-type granulator is the same as the D-type granulator. As an auxiliary gas, highly pressurized air for atomization is fed from a line 240 to around the nozzles 600, 700, and 800, and a molten raw material liquid is added from a line 37 to the nozzles 600, 700, and 800.

In the present invention, such a granulator may be provided with a nuclei-forming section and/or a cooling section, integrally. In this specification, those made by providing the A-type granulator and the B-type granulator integrally with a nuclei-forming section are referred to as the E-type granulator and the F-type granulator, respectively. FIG. 15 is a front view showing schematically the F-type granulator, which is a granulator made by integrating the B type granulator with a nuclei-forming function, and FIG. 16 is a plane view showing schematically the F-type granulator. In the F-type granulator shown in FIG. 15, a molten raw material liquid, fed from a line 156 to a spray-nozzle 154, is sprayed, so that urea 152 is fed to a spraying zone 151, where urea 152 forms nuclei having an average particle diameter of 0.4 to 3.0 mm. In this granulator, the spraying zone 151 and a granulation zone 155 are separated by a separation wall 153, but a part of the separation wall 153 for the flow 170 of nuclei particles from the spraying zone 151 to the granulation zone 155 is opened, and the nuclei particles are moved through that part to the granulation zone. Air for spraying granulation from a line 42, is fed through a bottom floor 9, into the spraying zone 151, under the conditions indicated in the above nuclei producer 150, and it is withdrawn from a line 43. The pressure in the spraying zone 151, and the pressure in the granulation zone 155, are approximately the same, and generally they are operated under a negative pressure of 5 to 10 mmAq (millimeter by water head).

Incidentally, by removing the partition walls 100 and 101 from the F-type granulator, the E-type granulator is made. A granulator made by integrating the C-type granulator or the D-type granulator with a nuclei-forming function (hereinafter referred to as the G-type granulator or the H-type granulator) can also be used. For the E-type granulator, the G-type granulator, and the H-type granulator, although their drawings are omitted, it is needless to say that they are certainly included in the present invention.

FIG. 17 is a plane view of the S-type granulator, which shows schematically one embodiment formed by providing a cooling zone 50 to the F-type granulator made by providing the B-type granulator integrally with a nuclei-forming section, so that the S-type granulator may have a cooling function incorporated. The S-type granulator includes a granulator made by providing the B-type granulator integrally with a cooling zone (a passage for cooling). The present invention is not restricted to the B-type granulator provided with a cooling zone and the F-type granulator provided with a cooling zone; the present invention also includes those based on the D-type and the H-type (hereinafter abbreviated to the SS type) etc. as embodiments. Parenthetically, the bottom floor section of the cooling zone 50 may be the same as the bottom floor section of the granulator. Further, although not shown in the figures, the air feed pipe for air for fluidization to be fed to the bottom floor section of the cooling zone 50 is suitably placed separately from that for the granulator. The temperature of air fed to the cooling zone 50 may be kept at room temperature or lower. Herein, the term "cooling" means that the layer temperature of the level 12 (kept at 100° C. or over) is brought to a prescribed temperature or lower than the prescribed temperature (generally 60° C. or less, and preferably 40 to 50° C.) of the product taken out from the granulator. In passing, the A-type granulator, the C-type granulator, the E-type granulator, or the G-type granulator may be integrated with a cooling function.

The perforated plate of the bottom floor 9 of the granulator is formed with openings and is situated such that nuclei and urea or the like that are growing may be caused to flow continuously from the inlet of the granulator toward the outlet of the granulator. The direction of the flow of the air passing through the openings, to cause the flow of the particles or nuclei to be directed toward the outlet of the granulator, is selected to be 60 degrees or less with the vertical axis, for ease of the production.

Parenthetically, of course, in the present invention, as is shown in Example 18, described later, when sulfur is sprayed from the latter section nozzles of the granulator, delayed-effective urea coated with sulfur can be obtained. The proportion of the number of the latter section nozzles in relation to the number of all the nozzles varies depending on the nominal and the thickness of the coating of sulfur, and it is selected to be generally 10 to 30%, and preferably 10 to 20%.

Figure 2:
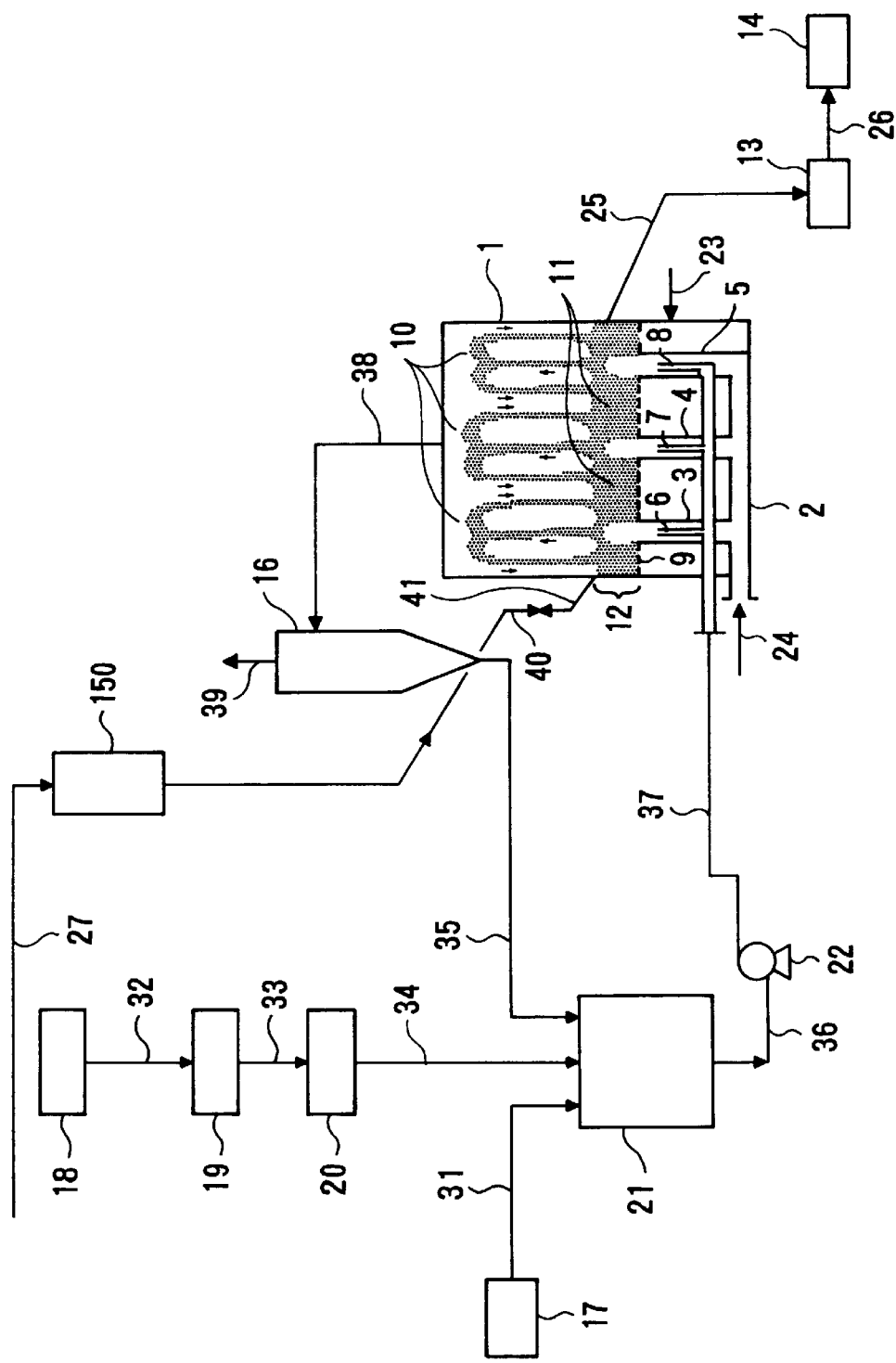
FIG. 2 is an illustrative view showing one embodiment of a urea/ammonium sulfate fertilizer granulator of the present invention.

The granulation method of the present invention can be carried out in accordance with the production processes shown in FIGS. 1 and 2 using the above granulators.

According to the method of the present invention, the step of crushing nonstandard granules can be omitted. Therefore, the production processes shown in FIGS. 1 and 2 are different from the conventional process shown in FIG. 18, in that they do not include the crushing step (indicated by reference numerals 27 to 30 and 15 in FIG. 18) shown in FIG. 18.

The operating conditions themselves of the granulator 1 in the production method of the present invention can be carried out by referring to conventional known methods, as described in the patent publications supra, except that the points specified by the present invention are observed. The temperature of a layer 11, where granular urea, etc., are fluidized, is generally about 100° C. As is disclosed in JP-B-4-63729, for example, the number of the air feed pipes in the A-type granulator may be set in a density of 0.5 to 5 per m$^2$ or 6 to 10 per m$^2$, of the area of the bottom floor. The spraying angle of the nozzles 6, 7, and 8 is generally selected to be 30 to 80 degrees, and the rate of air to be fed to each of the air feed pipes 3, 4, and 5 is generally selected to be 250 to 10,000 Nm$^3$/h, when the output of urea is 1,000 tons/day. In this case, the flow velocity of air to be fed to the air feed pipes 3, 4, and 5 is selected to be generally 5 to 50 m/s, and preferably 10 to 20 m/s, and the temperature of the air is generally selected to be from ordinary temperature to 120° C. In passing, in the Examples, a molten raw material was fed in an amount of 4,400 kg/h per nozzle, but the present invention is not limited to that. Further, generally, the height of the level 12 is selected to be 0.1 to 1.0 m in the resting state, and 0.3 to 1.5 m in the fluidized state, and the height of the space 60 is selected to be 2 to 10 m from the bottom floor. Herein, it is needless to say that these operating conditions are applied not only to the above A-type granulator but also to the B-type granulator, the E-type granulator, the F-type granulator, and the S-type granulator. Further, although JP-B-4-63729 describes the granulation of urea, the production of something other than granular urea, for example sulfur, can be carried out under operating conditions approximately similar to the above operating conditions.

The operating conditions of the C-type granulator can be such that, as described in JP-B-60-13735, for example, the angle of the molten raw material spraying nozzles 600, 700, and 800, for which highly pressurized air is used as an auxiliary gas, is less than 20 degrees, the auxiliary gas fed from the line 240 to around the nozzles 600, 700, and 800 is 130 Nm$^3$/h, the flow velocity of the auxiliary gas is 60 to 300 m/sec, and preferably 150 to 280 m/sec, the level 12 is 0.3 to 1.5 m, and the height of the space 60 is 0.3 to 1.5 m. In the publication, an example is disclosed in which a molten raw material, in an amount of 325 kg/h, is fed per nozzle when the output of urea is 800 tons per day, and the amount of air 23 fed to the fluidized bed is 52,000 Nm$^3$/h.

Herein, these operating conditions can be applied not only to the C-type granulator but also to the D-type granulator, the G-type granulator, the H-type granulator, and the SS-type granulator.

FIG. 1 is an embodiment of the process for producing urea granules or sulfur granules. In the case of the granulation of urea according to FIG. 1, to produce nuclei for the granulation to be used in the granulator 1, separately prepared molten urea containing, for example, 99.5% by weight or more of urea is fed through the line 27 to the nuclei producer 150.

As the nuclei producer 150, for example, a nuclei producer wherein a spray system of a shower type is used, a nuclei producer wherein a spray system of an oscillated shower-type is used, a nuclei producer wherein a spray system of a basket type is used, and a nuclei producer wherein a disc rotation system is used can be mentioned, and generally a spray system of a shower-type and a spray system of an oscillated shower-type spray are chosen.

When this spray system of a shower type is employed, approximately spherical nuclei having an average particle diameter of 0.4 to 1.0 mm, and a particle diameter distribution of 0.4 to 1.0 mm, and approximately spherical nuclei having an average particle diameter of 0.4 to 2.0 mm and a particle diameter distribution of 0.4 to 2.0 mm, can be fed. The spray is of a shower nozzle type and is formed by forming a number of holes in a spherical plate with a curvature. In this system, preferably the following conditions are selected: the diameter of the holes formed in the spherical plate with a curvature is 0.3 to 0.4 mm, and the flow velocity through the holes is 0.5 to 2 mm/s. In addition, the flow velocity of air for cooling is selected to be 0.2 to 1.0 m/s, and generally it is 0.4 m/s. Particularly, when the system is integrated with the granulator, preferably the above operating conditions are observed.

When the nuclei producer 150 is placed outside of the granulator 1, as shown in FIG. 1, the operation can be carried out under the above operating conditions, and also the operation can be carried out under conditions similar to the above conditions.

For the nuclei producer 150, as another method, a spraying method using a spray of an oscillated shower-type can be used. As is well known, by using a spray-nozzles made by forming a number of holes in a spherical plate with a curvature and adjusting each of the diameter of the holes, the flow velocity through the holes, and the oscillation frequency, the sprayed molten urea is cooled and solidified. Therefore, after the cooling and solidifying, nuclei having an average particle diameter of 0.4 to 1.0 mm, and nuclei having an average particle diameter of 0.4 to 2.0 mm, can be obtained. For example, it is sufficient to select an oscillation frequency of 300 to 1,000 HZ, a hole diameter of 0.3 to 0.4 mm, and a flow velocity passing through the holes of 0.5 m/s to 2 m/s. For the shower-type spray-nozzles and the oscillated shower-type spray-nozzles, the flow velocity of air for cooling is chosen to be 0.2 to 1.0 m/s, and generally it is 0.4 m/s. The same is applied to the case wherein the nuclei producer is integrated with the granulator.

In the present invention, basically the number of nuclei in the granulator is the same as the number of the granules of the product discharged from the line 25. Therefore, for example, when a product of granules having a distribution with a nominal size of 2 to 4 mm, and an average particle diameter of 3 mm, is produced from nuclei having a particle diameter of 0.4 to 1.0 mm, it is enough to feed urea in an amount of about 1% by weight of the urea 17 fed to the granulator. Thus, the above nuclei producer 150 may be small. In a special case in which a urea-producing plant that uses the prilling method is provided close to it, since nuclei having an average particle diameter of 0.4 to 1.0 mm, and nuclei having an average diameter of 0.4 to 2.0 mm, are contained, though the amount is very small, previously classified nuclei may indeed be used.

On the other hand, the urea 17 is an aqueous urea solution containing urea in a concentration of generally 90% by weight or more, and preferably 95% by weight or more. The urea 17 is fed through a line 31 to a mixing tank 21.

Further, in the mixing tank 21, the urea 17 is mixed uniformly with a small amount of dust fed through a line 35 from a cyclone 16. The urea in the mixing tank 21 is passed through a line 36, a pump 22, and a line 37, and it is sprayed from nozzles 6, 7, and 8 as liquid droplets having a diameter of 150 to 600 μm, which adhere to the nuclei, making the nuclei grow. Parenthetically, when the C-type granulator is used, the liquid droplets having a diameter of 20 to 120 μm are sprayed from the nozzles 600, 700, and 800, to adhere to the nuclei, to allow the nuclei to grow.

In the present invention, the cases wherein the A-type granulator (FIGS. 9 to 11) was used and the nominal product size was 2 to 4 mm, are shown in Example 1, and Examples 3 to 6 below. As is shown in the Examples 1, 3 to 6 compared to Comparative Example 1, in comparison to the case wherein the crushed granules are recycled, the proportion of the nominal product size at the outlet of the granulator becomes large. To increase the proportion of the nominal product size, as is shown in one example in Example 5, it is recommended to recycle smaller nonstandard granules, separated by the sieve 13 to be under the sieve 13, to the granulator 1. The point where the recycle is made is not limited to the inlet of the granulator 1, and it may be a point halfway up to the granulator 1, which point is set previously by testing.

Now, in the case of the B-type granulator, the configuration of the granulator by which the proportion of the nominal product size at the outlet of the granulator can be made larger than that of the A-type granulator is described, which is not intended to limit the present invention. The operating conditions of these granulators are the same as above.

Letting the length of the bottom section of the granulator in the direction of the flow be L, and the width of the flow of particles (granules or nuclei) be M (L>M), and the height of the granulator be H, the inner volume V is the product of them. Generally the L/M of the A-type granulator is selected empirically to be from 2 to 4. In the present invention, the B-type granulator has a configuration that is more elongate than the conventional configuration, by providing the above partition walls 100 and 101. Assuming V and H are constant, generally the L/M of the B-type granulator is selected to be in a range of from 10 to 40, and preferably from 20 to 40. If the L/M is over 4 but less than 10, the effect is obtained but is not very remarkable sometimes in comparison with the A-type granulator. If the L/M is over 40, the effect of the present invention increases little, and therefore it should be avoided.

The above configuration of the granulator is not necessarily linearly elongate, and generally it is bent. Generally that can be attained by providing partition walls in the granulator.

To express the mixing properties of apparatuses, there is a complete mixing tank row model that approximates the mixing properties of the apparatus by a series connection of complete mixing tanks in a number of N whose volumes are the same. It is known that, according to the model, the larger the number N, the narrower the distribution of the residence time of the individual granules.

Further, it is known that, if the tanks are not partitioned, by making the configuration specifically elongate as a whole, the same effect as that of the partitioned case can be obtained, and the residence time distribution of the individual granules is made narrow.

The inventors of the present invention have found, for example, that to increase the above number of N, a specific elongate configuration is preferable, and that when the direction of the flow of air passing through the holes made in the perforated plate has an angle with the direction of the flow of granules with respect to the vertical axis, the granules are moved uniformly in the direction of the flow, i.e. toward the outlet of the granulator, with an inverse mixing occurring less, and that, therefore, the residence time distribution is made narrow, leading to a granulator that can attain the object of the present invention more favorably.

From the above, it has been found that, in the case of a nominal size of 2 to 4 mm, as shown below in Examples 7 to 10, 12, and 14 to 16, by feeding approximately spherical nuclei having an average particle diameter of 0.4 to 1.0 mm, and preferably having a particle distribution of 0.4 to 1.0 mm, and more preferably having a particle distribution of 0.5 to 0.8 mm, to have a uniform particle diameter, to a granulator having a specific elongate configuration, instead of the conventional A-type granulator or C-type granulator, a product having a large proportion of the nominal product size and free from odd-shaped granules can be obtained.

Therefore, it has been found that, when a granulator having a specific elongate configuration is used, recycling the product under the sieve to increase the proportion of the nominal product size is not needed, or the amount to be recycled under the sieve to the granulator is quite small.

Figure 19:
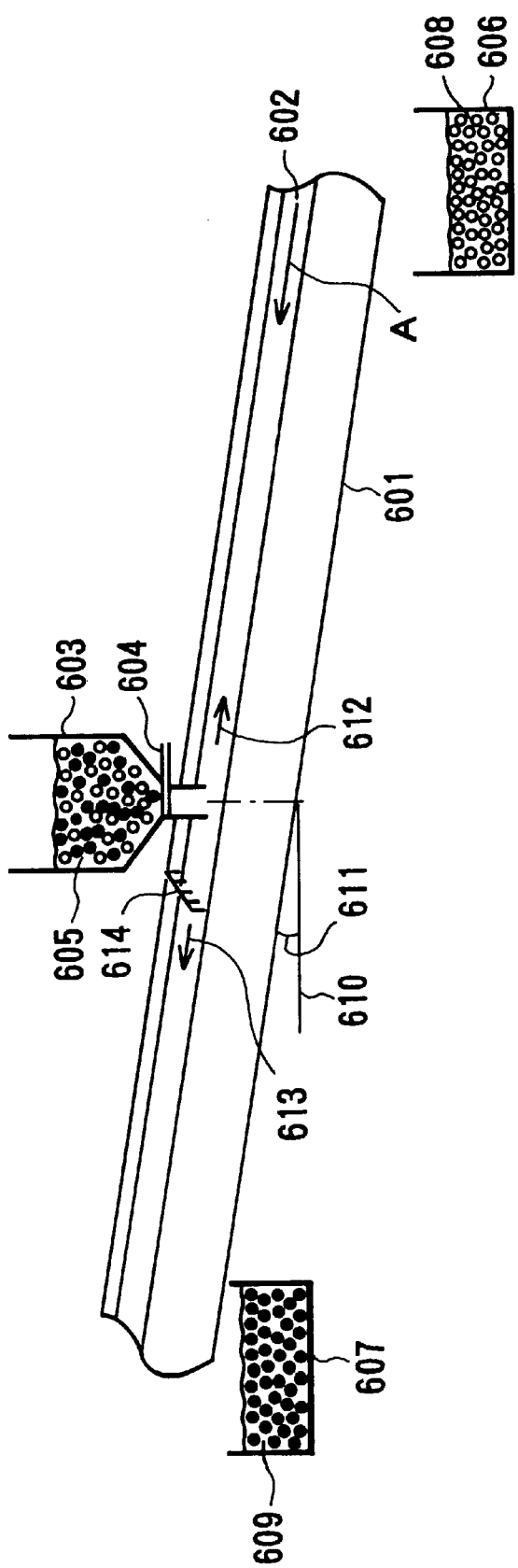
FIG. 19 is a perspective view of the apparatus for testing the sphericality of a granulated product.

The presence or absence (measurement) of odd-shaped granules of the product in this specification can be determined by the following method. FIG. 19 shows a test apparatus for evaluation of the presence or absence of odd-shaped granules referred to in the present invention. In FIG. 19, a belt conveyor 601 has guides of length about 10 cm at its opposite ends in the longitude direction, and it is provided with a belt 602 of width about 20 cm, in order to prevent the later-described supplied sample 603 from falling out of the belt conveyor 601. The length of the belt conveyor 601 is not particularly restricted, but it is preferable to adjust it to 0.5 m to 2.0 m. Here, the belt conveyor 601 is arranged to have a slope (with an angle 601) of 0 to 20 degrees to a horizontal direction 610. The belt 602 is rotated from the lower end of the slope toward the higher end thereof (in the direction of the arrow A) at 100 cm/min to 500 cm/min.

Further, a hopper 605, having a slide function 604 for supplying the supplied sample 603 to the belt 602, is provided near the center of the belt conveyor 601. The space between the tip of the hopper 605 and the belt 602 is suitably adjusted in advance so that the supplied sample 603 may flow out, and then the supplied sample 603 is subjected to the later-described test. Here, the supplied sample 603 is provided generally in an amount of 50 to 300 g.

Further, a rake 614 is placed at a distance of 50 to 200 mm from the supplied sample 603 in the direction of the rotation of the belt 602. The above rake 614 can break masses of particles (granules) of the supplied sample 603 uniformly, to improve the accuracy of the measurement.

The test method that uses this apparatus is now described. The supplied sample 603 is passed through the hopper 605 and the slide function 604, to be supplied onto the belt 602 that is being rotated. At that time, those that are approximately spherical are led to a direction 612 opposite to the direction of the rotation of the belt 602, and they accumulate as a spherical sample 608 in a saucer 606. On the other hand, since odd-shaped granules accumulate on the belt 602, they are led to a direction 613, in the same direction as the belt, and accumulate as odd-shaped granules 609 in a saucer 607.

The above test conditions were set by using a standard sample whose proportion of odd-shaped granules was previously adjusted, and evaluation was carried out by carrying out the test of the supplied sample under the same test conditions.

Sphere coefficient (%)=100×(the weight of the spherical sample 608 in the supplied sample)/(the weight of the supplied sample 603)

In the present invention, preferably a granulator integrated with a cooler is used. In many cases, in the granulator, the temperature of the layer wherein granule urea in the granulator is fluidized is kept at 100° C. or more, in order to dry the granulated material more favorably. To keep the temperature of that layer at 100° C. or more, generally, the air for the fluidization or spraying is heated by a heater. In the conventional method, wherein 30 to 50% of the granulated material at the outlet of the granulator is recycled to the granulator, if the granulated material is cooled to a temperature of 40 to 50° C., which is a desired final product temperature in the granulator integrated with a cooler, a special product cooler is not required, and the process is advantageously simplified. However, since the granules to be recycled are also cooled, to compensate for that heat loss, the air for the fluidization or spraying is required to be heated further, and therefore the energy consumption is increased, making the technique not practical. In the present invention, however, since granules are not recycled, or the amount of granules that is recycled is quite small, there is substantially no heat loss, and only the above advantage is secured. That is, by using the granulator integrated with a cooler, a product cooled to a temperature of 40 to 50° C., which is a desired final product temperature, can be obtained directly from the outlet of the granulator.

FIG. 2 is an illustration view of an embodiment of a process for producing a urea/ammonium sulfate fertilizer granular containing ammonium sulfate in an amount of 60% by weight or less, which is the same as that of FIG. 1, except the constitution of the raw material that is introduced into the mixing tank 21 of a molten raw material.

The flow of the molten raw material in FIG. 2 is such that, first, ammonium sulfate 18 is fed from a line 32 to a mill 19, wherein the average particle size is previously adjusted to generally 30 to 300 μm, and preferably 60 to 150 μm, then the ammonium sulfate is passed through a line 33 to a heater 20, wherein the temperature is adjusted to 100 to 160° C., and then it is fed through a line 34 to the mixing tank 21. If the average particle size is too large, the adhered ammonium sulfate particles make the surface of the product rough, in some cases. Second, the molten urea 17, fed from a urea plant or the like (not shown), is fed through a line 31 to the mixing tank 21, while keeping its temperature to 120 to 155° C. In the mixing tank 21, the liquid and the solid are mixed well with a stirrer or the like. Third, the top of the granulator 1 is connected to a line 38 that is led to a cyclone 16, and from the bottom of the cyclone 16, a powder is led into the mixing tank 21 through a line 35. From the top of the cyclone 16, excess gas (air) is removed through a line 39.

Herein, in FIGS. 1 and 2, description is made based on an example wherein the nuclei producer 150 and the granulator 1 are separately installed, but the nuclei producer 150 and the granulator 1 can be integrated, as described above. In that case, the nuclei producer 150 may be operated under the above operating conditions by using the above-described shower-type spray or oscillated shower-type spray. In passing, the position of the spray can be built in at a position lower than the roof in the granulator 1, as shown in an example in FIG. 15.

The granulation method of the present invention can be carried out by referring to granulation conditions and apparatuses described in JP-B-4-63729, JP-B-56-47181, and JP-B-60-13735, except for the points described above.

According to the improved granulator of the present invention and the improved granulation method of the present invention wherein the same is used, the following effects are exhibited:

(1) Since a step of recycling crushed granules is omitted, the process can be simplified and conventionally required incidental facilities are not required.

(2) In the granulation from a molten raw material, for example, of urea or sulfur and from a slurry, for example, of urea/ammonium sulfate, since a crusher can be omitted, the energy for crushing that is conventionally required can be omitted.

(3) Since a step of crushing can be omitted, the amount of dust that is generated can be remarkably reduced to about ⅓ of that of the conventional technique.

(4) Since approximately spherical nuclei having an average particle size of 0.4 to 3.0 mm can be fed to meet the nominal size of a product, a product whose particle diameters are uniform and that is free from odd-shaped granules can be obtained. Therefore, the yield of the product is very good.

(5) Since partition walls can be provided in the granulator, the ratio L/M becomes large. Further, since the direction of the flow of air passing through the holes made in the perforated plate in the bottom floor of the granulator has an angle with the direction of the flow of granules with respect to the vertical axis, inverse mixing can be prevented. Accordingly to the reasons above, the yield of a product is very good.

(6) Since a product having a temperature of 60° C. or below can be taken out from the granulator having a cooling function integrally, conventionally required incidental facilities are not required, and the product can be handled quite easily.

Now the present invention will be described with reference to Examples in more detail, but it is needless to say that the present invention is not limited to only these Examples.

EXAMPLES

Example 1

In the process shown in FIG. 1, use was made of a urea plant whose output was 1,000 tons per day. For the nuclei producer 150, a shower-type spray was used, and urea having a particle diameter of 0.4 to 1.0 mm was produced and fed to the granulator 1. The granulator 1 was of the A-type.

The L/M of the granulator 1 was 4, and the direction of the flow of air passing through holes formed in the perforated plate of the bottom floor of the granulator was 30 degrees with the vertical axis. The product was not recycled.

The chosen operating conditions were as follows: the nozzle spraying angle was 35 degrees, the fed amount per nozzle was such that 1.3 kg of 95 wt % molten urea, having a temperature of 125° C., was used per 1 $Nm^3$ of air at the air feed pipe outlet, the linear velocity at the air feed pipe outlet was 15 m/s, the linear velocity of air fed to the bottom floor where the granulated material was fluidized was 1.5 m/s, the level 12 was 1.0 m, the height of the space 60 was 6 m, and the layer temperature of the level 12 was 100° C. The test for the prevention of odd-shaped materials was carried out by the following method.

In the test apparatus in the above-mentioned FIG. 19, the belt width was 300 mm, the length of the apparatus was 1,500 mm, and the material of the belt was polyurethane. The test conditions were such that the belt speed was 380 cm/min, and the belt angle was set to be 10 to 15 degrees, in the following manner. To 90 parts by weight of granules whose nominal size was 2 to 4 mm and that were approximately spherical, was added 10 parts by weight of ones whose nominal size was the same as that of the former and that were made up of polygonal particles each having one or more apexes or united particles, to prepare a standard sample. Then, after the above belt angle was determined so that the sphere coefficient would be 90%, the test was repeated several times using 100 g of the sample of this Example, to find the average value of the sphere coefficient. The presence or absence of the odd-shaped materials was evaluated based on the following criteria:

○: the sphere coefficient was 90% or more (odd-shaped materials were favorably prevented from being produced).

Δ: the sphere coefficient was less than 90% but 80% or more (there were odd-shaped materials).

X: the sphere coefficient was less than 80% (there were many odd-shaped materials).

In passing, in the following Examples and Comparative Examples, the method for preparing a standard sample and the testing method were carried out in the same manner as before, except that the nominal size was different. The operation results and the product hardness (strength) at that time were measured in accordance with ISO 8397-1988. The results compared to those of the product of the conventional method are shown in Table 1.

Example 2

The granulation was carried out in the same manner as in Example 1, except that, instead of the nuclei used in Example 1, particles having a particle distribution of 0.8 to 2.8 mm produced by the prilling method were used as nuclei, thereby producing a nominal size of 5 to 8 mm product. The results are shown in Table 1.

Example 3

The granulation was carried out in the same manner as in Example 1, except that the angle with the vertical axis in

Example 1 was changed from 30 degrees to 0 degrees with the vertical axis. The results are shown in Table 1.

Example 4

The granulation was carried out in the same manner as in Example 3, except that the direction of the flow of the air passing through the holes formed in the perforated plate of the bottom floor of the granulator of Example 3 was changed from 0 degrees to 60 degrees with the vertical axis.

The results are also shown in Table 1.

Example 5

The granulation was carried out in the same manner as in Example 1, except that the smaller nonstandard product was recycled to the granulator. The results are also shown in Table 1.

Example 6

The granulation was carried out in the same manner as in Example 1, except that the shower-type spray for the production of nuclei was changed to an oscillated shower-type spray. The results are also shown in Table 1.

Example 7

The granulation was carried out in the same manner as in Example 1, except that the A-type granulator was changed to the B-type granulator, with the L/M being 10. The results are also shown in Table 1.

Example 8

The granulation was carried out in the same manner as in Example 7, except that the L/M was changed from 10 to 40. The results are also shown in Table 1.

TABLE 1

|  | Example 1 | Example 2 | Example 3 | Example 4 |
|---|---|---|---|---|
| Kind of product | Urea | Urea | Urea | Urea |
| Production method of nuclei (spray system) | Prilling (Shower-type) | Prilling (Shower-type) | Prilling (Shower-type) | Prilling (Shower-type |
| Average particle diameter of nuclei (mm) | 0.65 | 1.6 | 0.65 | 0.65 |
| Particle diameter of nuclei (mm) | 0.4 to 1.0 | 0.8 to 2.4 | 0.4 to 1.0 | 0.4 to 1.0 |
| Nominal product size (mm) | 2 to 4 | 5 to 8 | 2 to 4 | 2 to 4 |
| Recycle ratio to product (–) | 0 | 0 | 0 | 0 |
| Content of nominal product size at granulator outlet (%) | 85 | 70 | 85 | 85 |
| Content of nominal product size in product (%) | 85 | 70 | 85 | 85 |
| Strength ratio of this product to conventional product*2 | 1.0 | 1.0 | 1.0 | 1.0 |
| Ratio of generated dust to amount of product (%) | 1 | 1 | 1 | 1 |
| Direction of flow of air passing through holes (angle with respect to vertical axis) | 30 | 30 | 0 | 60 |
| Type of granulator | A | A | A | A |
| Configuration of granulator L/M (–) | 4 | 4 | 4 | 4 |
| Prevention of odd-shaped granules | ◯ | ◯ | ◯ | ◯ |

|  | Example 5 | Example 6 | Example 7 | Example 8 |
|---|---|---|---|---|
| Kind of product | Urea | Urea | Urea | Urea |
| Production method of nuclei (spray system) | Prilling (Shower-type) | Prilling (Oscillated shower-type) | Prilling (Shower-type) | Prilling (Shower-type) |
| Average particle diameter of nuclei (mm) | 0.65 | 0.65 | 0.65 | 0.65 |
| Particle diameter of nuclei (mm) | 0.4 to 1.0 | 0.5 to 0.8 | 0.4 to 1.0 | 0.4 to 1.0 |
| Nominal product size (mm) | 2 to 4 | 2 to 4 | 2 to 4 | 2 to 4 |
| Recycle ratio to | 0.1 | 0 | 0 | 0 |
| Content of nominal product size at granulator outlet (%) | 85 | 88 | 91 | 94 |
| Content of nominal product size in product (%) | 91 | 88 | 91 | 94 |
| Strength ratio of this product to conventional product | 1.0 | 1.0 | 1.0 | 1.0 |
| Ratio of generated dust | 1 | 1 | 1 | 1 |

TABLE 1-continued

| | | | | |
|---|---|---|---|---|
| to amount of product (%) | | | | |
| Direction of flow of air passing through holes (angle with respect to vertical axis) | 30 | 30 | 30 | 30 |
| Type of granulator | A | A | B | B |
| Configuration of granulator L/M (–) | 4 | 4 | 10 | 40 |
| Prevention of odd-shaped granules | ◯ | ◯ | ◯ | ◯ |

*1: Urea/Ammonium sulfate (50 wt %/50 wt %)
Type of granulator and FIG. No.: A, FIGS. 9–11; B, FIGS. 3–5; C, FIGS. 12–14; D, FIGS. 6–8; E, none; F, FIGS. 15 and 16; G, none; H, none; S, FIG. 17; SS, none.
*2: The term "conventional product" means a product produced by the granulation method as described in JP-B-4-63729, for the cases of the urea granule product, and a product produced by the method as described in this specification using the apparatus shown in FIG. 18, for the cases of the urea/ammonium sulfate granule product.

Example 9

The granulation was carried out in the same manner as in Example 7, except that the kind of the product was changed from urea to urea/ammonium sulfate (50 wt. %/50 wt. %), and the process shown in FIG. 1 was changed to the process shown in FIG. 2. The results are shown in Table 2.

Example 10

The granulation was carried out in the same manner as in Example 7, except that the kind of the product was changed from urea to sulfur.

The results are also shown in Table 2.

Example 11

The granulation was carried out in the same manner as in Example 1, except that the granulator was changed from the A-type to the C-type, the output of urea was changed from 1,000 tons per day to 800 tons per day, and the operating conditions were selected as follows: the nozzle spraying angle was 20 degrees, the fed amount per nozzle was 325 kg/h, the auxiliary gas fed to the nozzle was in an amount of 130 Nm³/h, the flow velocity of the auxiliary gas was 275 m/sec, and the amount of air fed to the fluidized bed was 152,000 Nm³/h, with the level 12 being 1 m and the space 60 being 1 m.

The results are also shown in Table 2.

Example 12

The granulation was carried out in the same manner as in Example 11, except that the granulator was changed from the C-type to the D-type. The results are also shown in Table 2.

Example 13

The granulation was carried out in the same manner as in Example 1, except that, in place of the A-type granulator, the E-type granulator, wherein the granulator of Example 1 was integrated with a shower-type spray, was used. The results are also shown in Table 2.

Example 14

The granulation was carried out in the same manner as in Example 7, except that, in place of the B-type granulator of Example 7, the granulator (of the F-type) wherein the granulator of Example 7 was integrated with an oscillated shower-type spray, was used. The results are also shown in Table 2.

TABLE 2

| | Example 9 | Example 10 | Example 11 | Example 12 | Example 13 | Example 14 |
|---|---|---|---|---|---|---|
| Kind of product | *1 | Sulfur | Urea | Urea | Urea | Urea |
| Production method of nuclei (spray system) | Prilling (Shower-type) | Prilling (Shower-type) | Prilling (Shower-type) | Prilling (Shower-type) | Prilling (Shower-type) | Prilling (Oscillated shower-type) |
| Average particle diameter of nuclei (mm) | 0.65 | 0.65 | 0.65 | 0.65 | 0.65 | 0.65 |
| Particle diameter of nuclei (mm) | 0.4 to 1.0 | 0.4 to 1.0 | 0.4 to 1.0 | 0.4 to 1.0 | 0.4 to 1.0 | 0.5 to 0.8 |
| Nominal product size (mm) | 2 to 4 | 2 to 4 | 2 to 4 | 2 to 4 | 2 to 4 | 2 to 4 |
| Recycle ratio to product (–) | 0 | 0 | 0 | 0 | 0 | 0 |
| Content of nominal product size at granulator outlet (%) | 90 | 91 | 85 | 91 | 85 | 94 |
| Content of nominal product size in product (%) | 90 | 91 | 85 | 91 | 85 | 94 |
| Strength ratio of this product to conventional product | 1.0 | 1.0 | 1.0 | 1.0 | 1.0 | 1.0 |

TABLE 2-continued

|  | Example 9 | Example 10 | Example 11 | Example 12 | Example 13 | Example 14 |
|---|---|---|---|---|---|---|
| Ratio of generated dust to amount of product (%) | 2 | 1 | 1 | 1 | 1 | 1 |
| Direction of flow of air passing through holes (angle with respect to vertical axis) | 30 | 30 | 30 | 30 | 3.0 | 30 |
| Type of granulator | B | B | C | D | E | F |
| Configuration of granulator L/M (–) | 10 | 10 | 4 | 10 | 4 | 10 |
| Prevention of odd-shaped granules | ○ | ○ | ○ | ○ | ○ | ○ |

*1: Urea/Ammonium sulfate (50 wt %/50 wt %)
Type of granulator and FIG. No.: B, FIGS. 3–5; C, FIGS. 12–14; D, FIGS. 6–8; E, none; F, FIGS. 15 and 16.

Example 15

The granulation was carried out in the same manner as in Example 12, except that, in place of the granulator (of the D-type) of Example 12, the granulator (of the G-type), wherein the granulator (of the D-type) of Example 12 was integrated with a shower-type spray, was used.

The results are shown in Table 3.

Example 16

The granulation was carried out in the same manner as in Example 12, except that, in place of the granulator (of the F-type) of Example 14, the granulator (of the S-type), wherein the granulator (of the F-type) of Example 14 was integrated with a cooling function, was used.

The results are also shown in Table 3.

Example 17

The granulation was carried out in the same manner as in Example 1, except that a product having a nominal size of 10 to 15 mm was produced by using the product obtained in Example 1 as nuclei. The results are shown in Table 3.

Example 18

The granulation was carried out in the same manner as in Example 7, except that the urea fed to the nozzles, which were positioned in the latter section and corresponded to about 20% of all the nozzles, was changed to sulfur.

The results are shown in Table 3.

Comparative Example 1

Figure 18:
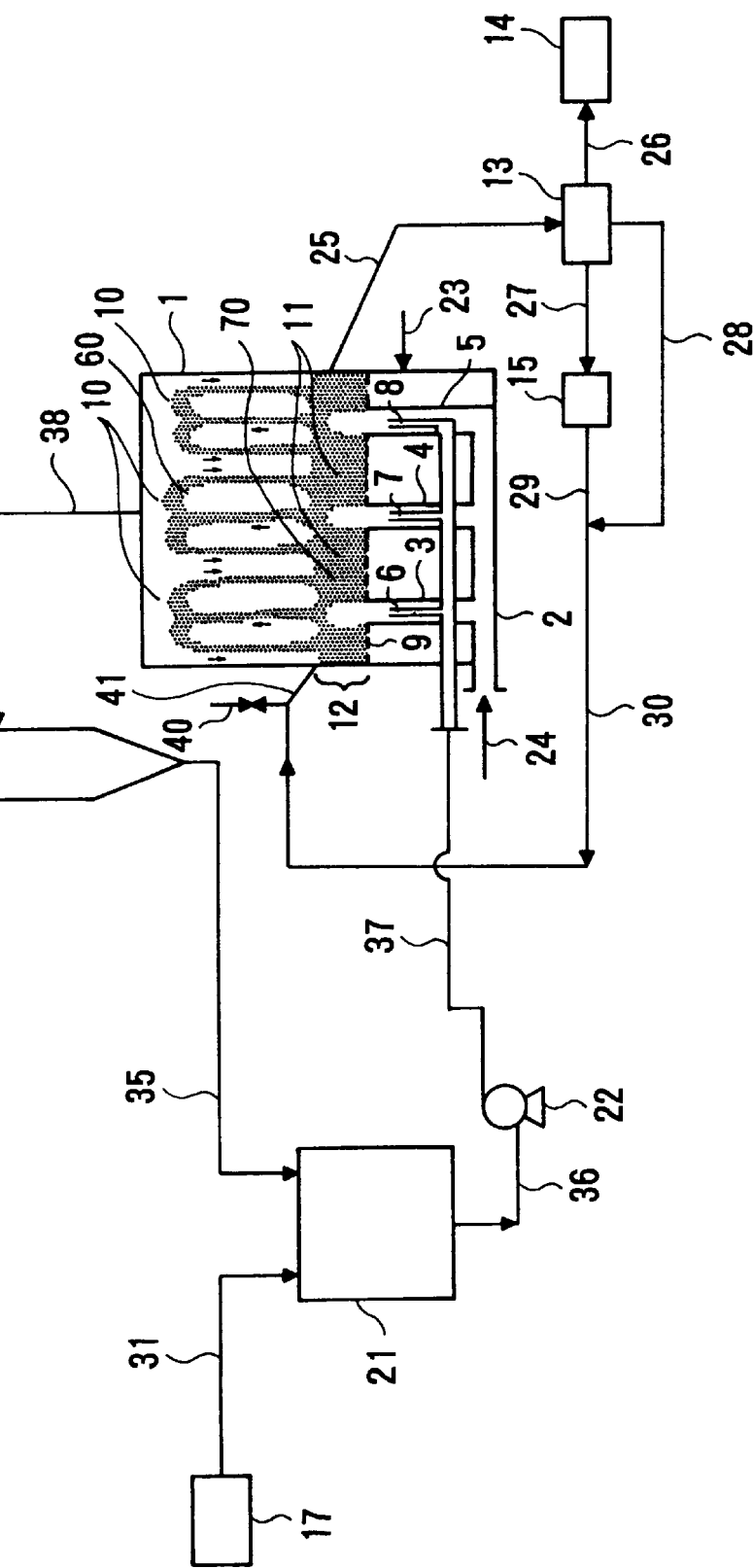
FIG. 18 is an illustrative view showing one embodiment indicating a process for producing granular sulfur or urea according to the conventional technique.

Nuclei were produced by using the crusher shown in FIG. 18 (at that time, the shape of the crushed pieces was various and included polygons, columns, semispheres, cuboids, rhombuses, and the like, in a mixed manner.). By the conventional process, wherein the said nuclei were recycled to a granulator, urea was produced by using, as the granulator, the A-type granulator. The conditions and the results are also shown in Table 3.

Reference Example 1

The granulation was carried out in the same manner as in Example 2, except that the nominal product size of 5 to 8 mm in Example 2 was changed to a nominal product size of 2 to 4 mm. The results are also shown in Table 3.

Reference Example 2

The granulation was carried out in the same manner as in Reference Example 1, except that the urea was changed to urea/ammonium sulfate. The results are also shown in Table 3.

TABLE 3

|  | Example 15 | Example 16 | Example 17 | Example 18 |
|---|---|---|---|---|
| Kind of product | Urea | Urea | Urea | *3 |
| Production method of nuclei (spray system) | Prilling (Shower-type) | Prilling (Oscillated shower-type) | Granulation — | Prilling (Shower-type) |
| Average particle diameter of nuclei (mm) | 0.65 | 0.65 | 3.0 | 0.65 |
| Particle diameter of nuclei (mm) | 0.4 to 1.0 | 0.4 to 1.0 | 2.0 to 4.0 | 0.4 to 1.0 |
| Nominal product size (mm) | 2 to 4 | 2 to 4 | 10 to 15 | 2 to 4 |
| Recycle ratio to product (–) | 0 | 0 | 0 | 0 |
| Content of nominal product size at granulator outlet (%) | 91 | 94 | 70 | 91 |
| Content of nominal product size in product (%) | 91 | 94 | 70 | 91 |
| Strength ratio of this product to conventional product | 1.0 | 1.0 | 1.0 | 1.0 |

TABLE 3-continued

|  |  |  |  |  |
|---|---|---|---|---|
| Ratio of generated dust to amount of product (%) | 1 | 1 | 1 | 1 |
| Direction of flow of air passing through holes (angle with respect to vertical axis) | 30 | 30 | 30 | 30 |
| Type of granulator | G | S | A | B |
| Configuration of granulator L/M (−) | 10 | 10 | 4 | 10 |
| Prevention of odd-shaped granules | ◯ | ◯ | ◯ | ◯ |

|  | Comparative Example 1 | Reference Example 1 | Reference Example 2 |
|---|---|---|---|
| Kind of product | Urea | Urea | *1 |
| Production method of nuclei (spray system) | Crusher | Prilling (Shower-type) | Prilling (Shower-type) |
| Average particle diameter of nuclei (mm) | 1.3 | 1.6 | 1.6 |
| Particle diameter of nuclei (mm) | 0.1 to 2.5 | 0.8 to 2.8 | 0.8 to 2.8 |
| Nominal product size (mm) | 2 to 4 | 2 to 4 | 2 to 4 |
| Recycle ratio to product (−) | 0.5 | 0 | 0 |
| Content of nominal product size at granulator outlet (%) | 75 to 80 | 85 | 85 |
| Content of nominal product size in product (%) | 90*4 | 85 | 85 |
| Strength ratio of this product to conventional product | 1.0 | 0.7 to 0.8 | 0.7 to 0.8 |
| Ratio of generated dust to amount of product (%) | 3 | 1 to 2 | 2 to 3 |
| Direction of flow of air passing through hole (angle with respect to vertical axis) | — | 30 | 30 |
| Type of granulator | A | A | A |
| Configuration of granulator L/M (−) | 4 | 4 | 4 |
| Prevention of odd-shaped granules | X | ◯ | ◯ |

*1: Urea/Ammonium sulfate (50 wt %/50 wt %)
Type of granulator and FIG. No.: A, FIGS. 9–11; B, FIGS. 3–5; G, none; S, FIG. 17.
*3: Urea coated with sulfur
*4: The results when sieved with a sieve.

Having described our invention as related to the present embodiments, it is our intention that the invention not be limited by any of the details of the description, unless otherwise specified, but rather be construed broadly within its spirit and scope as set out in the accompanying claims.

What we claim is:

1. An improved granulation method comprising the steps of providing a granulator having a granulation section whose bottom wall is a perforated plate, an upper air feed pipe for feeding air for fluidization to the bottom wall of the granulation section, a lower air feed pipe, secondary air feed pipes branching for the lower air feed pipe for feeding air into the granulation section, and spraying nozzles provided at the centers of the secondary air feed pipes for spraying a molten raw material and spraying a molten raw material from the spraying nozzles onto approximately spherical nuclei in the granulation section, which have an average particle diameter of 0.4 to 3.0 mm, to form product granules.

2. An improved granulation method comprising the steps of providing a granulator having a granulation section whose bottom wall is a perforated plate, an air feed pipe for feeding air for fluidization to the bottom wall of the granulation section, and spraying nozzles provided in the bottom wall for spraying a molten raw material by using highly pressurized air as an auxiliary gas and spraying a molten raw material from the spraying nozzles onto approximately spherical nuclei in the granulation section, which have an average particle diameter of 0.4 to 3.0 mm, to form product granules.

3. An improved granulation method comprising the steps of providing a granulator having a granulation section whose bottom wall is a perforated plate, an upper air feed pipe for feeding air for fluidization to the bottom wall of the granulation section, a lower air feed pipe, secondary air feed pipes branching from the lower air feed pipe for feeding air into the granulation section, spraying nozzles provided at the centers of the secondary air feed pipes for spraying a molten raw material, and one or more partition walls provided on the bottom wall for partitioning the secondary air feed pipes, so that the partition walls form a passage in which nuclei may be moved continuously from the inlet of the granulator toward the outlet of the granulator and spraying a molten raw material from the spraying nozzles onto the nuclei, which are approximately spherical, in the granulation section, and which have an average particle diameter of 0.4 to 3.0 mm, to form product granules.

4. An improved granulation method comprising the steps of providing a granulator having a granulation section whose bottom wall is a perforated plate, an air feed pipe for feeding air for fluidization to the bottom wall of the granulation section, spraying nozzles provided in the bottom wall for spraying a molten raw material by using highly pressurized air as an auxiliary gas, and one or more partition walls provided on the bottom wall for partitioning the nozzles, so that the partition walls form a passage in which nuclei may be moved continuously from the inlet of the granulator toward the outlet of the granulator and spraying a molten raw material from the spraying nozzles onto the nuclei, which are approximately spherical, in the granulation section, and which have an average particle diameter of 0.4 to 3.0 mm, to form product granules.

5. The improved granulation method as claimed in claim 1, wherein the molten raw material is sprayed through a spray nozzle comprising a curved spherical plate with a number of holes provided therein, the sprayed molten urea is cooled and solidified, and cooled solidified approximately spherical nuclei, having an average particle diameter of 0.4 to 2.0 mm, are fed to the granulation section.

6. The improved granulation method as claimed in claim 1, wherein the molten raw material is sprayed through an oscillating spray nozzle, the sprayed molten urea is cooled and solidified, and cooled solidified approximately spherical nuclei, having an average particle diameter of 0.4 to 2.0 mm, are fed to the granulation section.

7. The improved granulation method as claimed in claim 1, further comprising recycling to the granulator granules having smaller particle diameters out of the product granules, to make the particle diameter distribution of the product granules narrower.

8. The improved granulation method as claimed in claim 1, wherein the molten raw material liquid is selected from the group consisting of molten urea, molten urea in the form of a slurry containing another solid component in molten urea, and molten sulfur.

9. The improved granulation method as claimed in claim 1, wherein as the molten raw material, molten urea is fed to a first set of nozzles of the granulator, and molten sulfur is fed to a second set of nozzles of the granulator.

10. An improved granulator comprising a granulation section whose bottom wall is a perforated plate, an upper air feed pipe for feeding air for fluidization to the bottom wall of the granulation section, a lower air feed pipe, secondary air feed pipes branching from the lower air feed pipe for feeding air into said granulation section, and spraying nozzles provided at the centers of the secondary air feed pipes for spraying a molten raw material liquid and forming granules by spraying a molten raw material onto nuclei fed into the granulation section, the nuclei having a prescribed particle diameter, and the direction of flow of air passing through holes in the perforated plate having a slanted angle to the direction of flow of granules with respect to the vertical axis.

11. An improved granulator comprising a granulation section whose bottom wall is a perforated plate, an upper air feed pipe for feeding air for fluidization to the bottom wall of the granulation section, a lower air feed pipe, secondary air feed pipes branching from the lower air feed pipe for feeding air into the granulation section, spraying nozzles provided at the centers of the secondary air feed pipes for spraying a molten raw material, and partition walls provided on the bottom wall for partitioning the secondary air feed pipes so that the partition walls form a passage in which nuclei may be moved continuously from the inlet of the granulator toward the outlet of the granulator, and form granules by spraying a molten raw material from the spraying nozzles onto the nuclei in the granulation section, the nuclei having a prescribed particle diameter, and the direction of flow of air passing through holes in the perforated plate having a slanted angle to the direction of flow of granules with respect to the vertical axis.

12. An improved granulator comprising a granulation section whose bottom wall is a perforated plate, an air feed pipe for feeding air for fluidization to the bottom wall of the granulation section, and spraying nozzles provided in the bottom wall for spraying a molten raw material liquid by using highly pressurized air as an auxiliary gas and forming granules by spraying a molten raw material onto nuclei in the granulation section, the nuclei having a prescribed particle diameter, and the direction of flow of air passing through holes in the perforated plate having a slanted angle to the direction of flow of granules with respect to the vertical axis.

13. An improved granulator comprising a granulation section whose bottom wall is a perforated plate, an air feed pipe for feeding air for fluidization to the bottom wall of the granulation section, spraying nozzles provided in the bottom wall for spraying a molten raw material by using highly pressurized air as an auxiliary gas, and partition walls provided on the bottom wall for partitioning the nozzles and forming a passage in which nuclei may be moved continuously from the inlet of the granulator toward the outlet of the granulator and form granules by spraying a molten raw material from the spraying nozzles onto the nuclei in the granulation section, the nuclei having a prescribed particle diameter, and the direction of flow of air passing through holes in the perforated plate having a slanted angle to the direction of flow of granules with respect to the vertical axis.

14. A granulator comprising one or more partition walls provided on a bottom wall of a granulation section, the partition walls being parallel to the walls of the granulator and forming a passage in which nuclei may be moved continuously from the inlet of the granulator toward the outlet of the granulator, the partition walls being staggered so that at least one of the partition walls extends from a first side of the granulator toward an opposite side of the granulator, and another partition wall extends from the opposite side of the granulator toward the first side of the granulator.

15. The improved granulator as claimed in claim 10, wherein the granulator has such a specified elongate configuration that the ratio L/M is at least 2 but no more than 40, in which L is the length of a bottom section of the granulator in the direction of the flow of the granules, and M is the width of the flow of the granules.

16. The improved granulator as claimed in claim 10, wherein the granulator has integrally a means for feeding, as nuclei, approximately spherical nuclei having an average particle diameter of 0.4 to 1.0 mm to the granulator.

17. The improved granulator as claimed in claim 16, wherein the means integrated with the granulator for feeding approximately spherical nuclei having an average particle diameter of 0.4 to 1.0 mm to the granulator, is a spray nozzle.

18. The improved granulator as claimed in claim 16, wherein the means integrated with the granulator for feeding approximately spherical nuclei having an average particle diameter of 0.4 to 1.0 mm to the granulator, is an oscillating spray nozzle.

19. The improved granulator as claimed in claim 10, wherein the means integrated with the granulator for feeding approximately spherical nuclei having an average particle diameter of 0.4 to 1.0 mm to the granulator, is integrated with a cooling means for cooling a product.

* * * * *